(12) United States Patent
Davis et al.

(10) Patent No.: US 9,083,687 B2
(45) Date of Patent: Jul. 14, 2015

(54) MULTI-DEVICE BEHAVIORAL FINGERPRINTING

(75) Inventors: Marc E. Davis, San Francisco, CA (US);
Matthew G. Dyor, Bellevue, WA (US);
Daniel A. Gerrity, Seattle, WA (US);
Xuedong Huang, Bellevue, WA (US);
Roderick A. Hyde, Redmond, WA (US);
Royce A. Levien, Lexington, MA (US);
Richard T. Lord, Gig Harbor, WA (US);
Robert W. Lord, Seattle, WA (US);
Mark A. Malamud, Seattle, WA (US);
Nathan P. Myhrvold, Medina, WA (US); Clarence T. Tegreene, Mercer Island, WA (US)

(73) Assignee: ELWHA LLC, Bellevue, WA (US)

( * ) Notice: Subject to any disclaimer, the term of this patent is extended or adjusted under 35 U.S.C. 154(b) by 0 days.

(21) Appl. No.: 13/563,599

(22) Filed: Jul. 31, 2012

(65) Prior Publication Data

US 2014/0040989 A1 Feb. 6, 2014

Related U.S. Application Data

(63) Continuation-in-part of application No. 13/373,685, filed on Nov. 23, 2011, now Pat. No. 8,555,077, and a continuation-in-part of application No. 13/373,684, filed on Nov. 23, 2011, and a continuation-in-part of (Continued)

(51) Int. Cl.
*G06F 21/00* (2013.01)
*H04L 29/06* (2006.01)
*G06F 21/62* (2013.01)

(Continued)

(52) U.S. Cl.
CPC ................ *H04L 63/08* (2013.01); *H04L 63/10* (2013.01); *G06F 21/30* (2013.01); *G06F 21/31* (2013.01); *G06F 21/62* (2013.01); *H04L 63/0861* (2013.01); *H04L 63/0876* (2013.01); *H04L 63/102* (2013.01)

(58) Field of Classification Search
CPC . H04L 63/08; H04L 63/0861; H04L 63/0876; H04L 63/10; H04L 63/102; G06F 21/62; G06F 21/30; G06F 21/31
See application file for complete search history.

(56) References Cited

U.S. PATENT DOCUMENTS 6,084,953 A 7/2000 Bardenheuer et al.
6,829,596 B1 12/2004 Frazee (Continued)

FOREIGN PATENT DOCUMENTS

WO WO 2011/119273 A3 9/2011

OTHER PUBLICATIONS

U.S. Appl. No. 13/373,682, Davis et al.

(Continued)

*Primary Examiner* — Shewaye Gelagay
*Assistant Examiner* — Kendall Dolly

(57) ABSTRACT

Disclosed herein are example embodiments for multi-device behavioral fingerprinting by a user device or a server device. For certain example embodiments, at least one device may obtain at least one behavioral fingerprint that is associated with at least one authorized user, with the at least one behavioral fingerprint including one or more indicators of utilization of two or more user devices by the at least one authorized user. The at least one device may perform at least one authentication-related operation based at least partially on the at least one behavioral fingerprint.

33 Claims, 20 Drawing Sheets

Related U.S. Application Data application No. 13/373,680, filed on Nov. 23, 2011, now Pat. No. 8,689,350, and a continuation-in-part of application No. 13/373,677, filed on Nov. 23, 2011, now Pat. No. 8,688,980, and a continuation-in-part of application No. 13/373,682, filed on Nov. 23, 2011, and a continuation-in-part of application No. 13/475,564, filed on May 18, 2012, now Pat. No. 8,713,704, and a continuation-in-part of application No. 13/538,385, filed on Jun. 29, 2012, now Pat. No. 8,869,241, and a continuation-in-part of application No. 13/552,502, filed on Jul. 18, 2012.

(60) Provisional application No. 61/632,836, filed on Sep. 24, 2011, provisional application No. 61/572,309, filed on Oct. 13, 2011.

(51) Int. Cl.
G06F 21/31 (2013.01)
G06F 21/30 (2013.01)

(56) References Cited

U.S. PATENT DOCUMENTS

| | | |
|---|---|---|
| 6,957,199 B1 | 10/2005 | Fisher |
| 7,433,960 B1 | 10/2008 | Dube et al. |
| 7,533,155 B2 | 5/2009 | Kitada |
| 7,577,987 B2 | 8/2009 | Mizrah |
| 7,689,418 B2 | 3/2010 | Ramaswamy et al. |
| 7,794,769 B2 | 9/2010 | Cox et al. |
| 7,827,592 B2 | 11/2010 | Fifer et al. |
| 7,908,237 B2 | 3/2011 | Angell et al. |
| 7,975,150 B1 | 7/2011 | Lillibridge et al. |
| 8,020,005 B2 | 9/2011 | Mani et al. |
| 8,051,468 B2 | 11/2011 | Davis et al. |
| 8,078,515 B2 | 12/2011 | John |
| 8,155,999 B2 | 4/2012 | de Boer et al. |
| 8,160,943 B2 | 4/2012 | Smith et al. |
| 8,161,530 B2 | 4/2012 | Meehan et al. |
| 8,185,646 B2 | 5/2012 | Headley |
| 8,290,908 B2 | 10/2012 | McCarthy et al. |
| 8,316,237 B1 | 11/2012 | Felsher et al. |
| 8,358,579 B1 | 1/2013 | Walsh et al. |
| 8,364,713 B2 | 1/2013 | Pollard |
| 8,388,446 B1 | 3/2013 | Craine et al. |
| 8,392,969 B1 | 3/2013 | Park et al. |
| 8,522,147 B2 | 8/2013 | Bladel et al. |
| 8,582,829 B2 | 11/2013 | Shuster |
| 8,689,350 B2 | 4/2014 | Davis et al. |
| 8,713,704 B2 | 4/2014 | Davis et al. |
| 8,726,036 B2 | 5/2014 | Kornafeld et al. |
| 8,732,089 B1 | 5/2014 | Fang et al. |
| 8,776,168 B1 | 7/2014 | Gibson et al. |
| 8,806,598 B2 | 8/2014 | Assam |
| 8,819,789 B2 | 8/2014 | Orttung et al. |
| 2002/0046105 A1 | 4/2002 | Gardenswartz et al. |
| 2002/0073046 A1 | 6/2002 | David |
| 2003/0220980 A1 | 11/2003 | Crane |
| 2004/0002329 A1 | 1/2004 | Bhatia et al. |
| 2004/0193892 A1 | 9/2004 | Tamura et al. |
| 2005/0071643 A1 | 3/2005 | Moghe |
| 2005/0100198 A1 | 5/2005 | Nakano et al. |
| 2005/0171832 A1 | 8/2005 | Hull et al. |
| 2005/0268107 A1 | 12/2005 | Harris et al. |
| 2006/0020814 A1 | 1/2006 | Lieblich et al. |
| 2006/0020816 A1 | 1/2006 | Campbell |
| 2006/0074769 A1 | 4/2006 | Looney et al. |
| 2006/0133651 A1 | 6/2006 | Polcha et al. |
| 2006/0161553 A1 | 7/2006 | Woo |
| 2006/0218153 A1 | 9/2006 | Voon et al. |
| 2006/0224898 A1 | 10/2006 | Ahmed |
| 2007/0067853 A1 | 3/2007 | Ramsey |
| 2007/0245157 A1 | 10/2007 | Giobbi et al. |
| 2007/0245158 A1 | 10/2007 | Giobbi et al. |
| 2007/0250550 A1 | 10/2007 | Berninger |
| 2008/0091453 A1* | 4/2008 | Meehan et al. ............... 705/1 |
| 2008/0092209 A1 | 4/2008 | Davis et al. |
| 2008/0098456 A1 | 4/2008 | Alward et al. |
| 2008/0138472 A1 | 6/2008 | Alexandre |
| 2008/0146193 A1 | 6/2008 | Bentley et al. |
| 2008/0172461 A1 | 7/2008 | Thattai et al. |
| 2008/0235614 A1 | 9/2008 | Ricklefs et al. |
| 2008/0281668 A1 | 11/2008 | Nurminen |
| 2009/0006846 A1 | 1/2009 | Rosenblatt |
| 2009/0025081 A1 | 1/2009 | Quigley et al. |
| 2009/0030985 A1 | 1/2009 | Yuan |
| 2009/0070435 A1 | 3/2009 | Abhyanker |
| 2009/0113040 A1 | 4/2009 | Zalewski |
| 2009/0169062 A1 | 7/2009 | Cheung et al. |
| 2009/0210494 A1 | 8/2009 | Fisher et al. |
| 2009/0220653 A1 | 9/2009 | Doucet |
| 2009/0292010 A1 | 11/2009 | Shigemura et al. |
| 2009/0298514 A1 | 12/2009 | Ullah |
| 2010/0073202 A1 | 3/2010 | Mazed |
| 2010/0115592 A1 | 5/2010 | Belz et al. |
| 2010/0115610 A1 | 5/2010 | Tredoux et al. |
| 2010/0130165 A1 | 5/2010 | Snyder et al. |
| 2010/0169343 A1 | 7/2010 | Kenedy et al. |
| 2010/0174709 A1 | 7/2010 | Hansen et al. |
| 2010/0179856 A1 | 7/2010 | Paretti et al. |
| 2010/0179857 A1 | 7/2010 | Kalaboukis et al. |
| 2010/0186066 A1 | 7/2010 | Pollard |
| 2010/0250676 A1 | 9/2010 | Ufford et al. |
| 2010/0255172 A1 | 10/2010 | Maningat et al. |
| 2010/0274815 A1 | 10/2010 | Vanasco |
| 2010/0293094 A1 | 11/2010 | Kolkowitz et al. |
| 2010/0299292 A1 | 11/2010 | Collazo |
| 2010/0319053 A1 | 12/2010 | Gharabally |
| 2011/0016534 A1 | 1/2011 | Jakobsson et al. |
| 2011/0029887 A1 | 2/2011 | Pearson et al. |
| 2011/0072487 A1 | 3/2011 | Hadar et al. |
| 2011/0112898 A1 | 5/2011 | White |
| 2011/0131122 A1 | 6/2011 | Griffin et al. |
| 2011/0145927 A1 | 6/2011 | Hubner et al. |
| 2011/0196926 A1 | 8/2011 | Crawford |
| 2011/0209196 A1 | 8/2011 | Kennedy |
| 2011/0225048 A1 | 9/2011 | Nair |
| 2011/0231223 A1 | 9/2011 | Winters |
| 2011/0238482 A1 | 9/2011 | Carney et al. |
| 2011/0239276 A1 | 9/2011 | Garcia Garcia et al. |
| 2011/0251823 A1 | 10/2011 | Davis et al. |
| 2011/0276486 A1 | 11/2011 | Kuba |
| 2011/0302640 A1 | 12/2011 | Liu et al. |
| 2011/0314017 A1 | 12/2011 | Yariv et al. |
| 2011/0314559 A1 | 12/2011 | Jakobsson |
| 2011/0321157 A1 | 12/2011 | Davis et al. |
| 2012/0030764 A1 | 2/2012 | White et al. |
| 2012/0041822 A1 | 2/2012 | Landry et al. |
| 2012/0131034 A1 | 5/2012 | Kenedy et al. |
| 2012/0136936 A1 | 5/2012 | Quintuna |
| 2012/0137340 A1 | 5/2012 | Jakobsson et al. |
| 2012/0144468 A1 | 6/2012 | Pratt et al. |
| 2012/0159647 A1 | 6/2012 | Sanin et al. |
| 2012/0198491 A1 | 8/2012 | O'Connell et al. |
| 2012/0198532 A1 | 8/2012 | Headley |
| 2012/0226701 A1 | 9/2012 | Singh |
| 2012/0284602 A1 | 11/2012 | Seed et al. |
| 2012/0284779 A1 | 11/2012 | Ingrassia, Jr. et al. |
| 2012/0323685 A1 | 12/2012 | Ullah |
| 2013/0013404 A1 | 1/2013 | Suprock et al. |
| 2013/0019289 A1 | 1/2013 | Gonser et al. |
| 2013/0024916 A1 | 1/2013 | Evans |
| 2013/0036458 A1 | 2/2013 | Liberman et al. |
| 2013/0036459 A1 | 2/2013 | Liberman et al. |
| 2013/0042327 A1 | 2/2013 | Chow |
| 2013/0054433 A1* | 2/2013 | Giard et al. ............... 705/34 |
| 2013/0054470 A1 | 2/2013 | Campos et al. |
| 2013/0055367 A1 | 2/2013 | Kshirsagar et al. |
| 2013/0061285 A1 | 3/2013 | Donfried et al. |
| 2013/0067546 A1 | 3/2013 | Thavasi et al. |
| 2013/0091262 A1 | 4/2013 | Rajakarunanayake et al. |
| 2013/0096980 A1 | 4/2013 | Basavapatna et al. |
| 2013/0097669 A1 | 4/2013 | Davis et al. |

(56) References Cited

U.S. PATENT DOCUMENTS

| | | |
|---|---|---|
| 2013/0097673 A1 | 4/2013 | Meehan et al. |
| 2013/0097683 A1 | 4/2013 | Davis et al. |
| 2013/0102283 A1 | 4/2013 | Lau et al. |
| 2013/0133052 A1 | 5/2013 | Davis et al. |
| 2013/0133054 A1 | 5/2013 | Davis et al. |
| 2013/0159413 A1 | 6/2013 | Davis et al. |
| 2013/0167207 A1 | 6/2013 | Davis et al. |
| 2013/0191887 A1 | 7/2013 | Davis et al. |
| 2013/0291099 A1 | 10/2013 | Donfried et al. |
| 2013/0305325 A1 | 11/2013 | Headley |
| 2013/0305336 A1 | 11/2013 | Konertz et al. |
| 2014/0158760 A1 | 6/2014 | Seker |

OTHER PUBLICATIONS

Trejo et al.; "Using Cloud Computing MapReduce operations to Detect DDoS Attacks on DNS servers"; Proceedings of the 4$^{th}$ Iberian Grid Infrastructure Conference; pdf created Mar. 1, 2013; pp. 1-13.

Xie et al.; "Privacy-Preserving Matchmaking for Mobile Social Networking Secure Against Malicious Users"; 2011 Ninth Annual International Conference on Privacy, Security and Trust; bearing a date of Jul. 11, 2011; pp. 1-8; IEEE.

PCT International Search Report; International App. No. PCT/US13/48664; Dec. 3, 2013; pp. 1-3.

Germanakos et al.; "Personalization Systems and Processes Review based on a Predetermined User Interface Categorization"; Proceedings of the III International conference on communication and reality, digital utopia in the media: From discourses to facts; May 2005; 12 pages.

Mobasher et al.; "Creatinig Adaptive Web Sites Through Usage-Based Clustering of URLs"; IEEE; 1999 (created on May 9, 2014); 7 pages.

Monrose et al.; "Keystroke dynamics as a biometric for authentication"; Future Generation Computer Systems; Mar. 3, 1999; pp. 351-359; vol. 16; © 2000 Elsevier Science B.V.

Nauman et al.; "TOKEN: Trustable Keystroke-Based Authentication for Web-Based Applications on Smartphones"; ISA 2010, CCIS 76; 2010 (created on May 9, 2014); pp. 286-297; © Springer-Verlap Berlin Heidelberg 2010.

Brainard, John; Juels, Ari; Rivest, Ronald L.; Szydlo, Michael; Yung, Moti; "Fourth-Factor Authentication: Somebody You Know"; ACM CCS; 2006; pp. 168-78; Alexandria, Virginia.

Diep, Francie; "Your finger swipe could become your password"; NBC News Future Tech; Oct. 2, 2012; http://www.nbcnews.com/technology/futureoftech/your-finger-swipe-could-become-your-password-6215845.

Gianchandani, Erwin; "DARPA Seeking to Develop a 'Cognitive Fingerprint'"; Computing Community Consortium Blog; Jan. 27, 2012; http://www.cccblog.org/2012/01/27/darpa-seeking-to-develop-a-cognitive-fingerprint/.

Jacobs, Tom; "Identity Protection That Really Clicks"; Pacific Standard Magazine; May 3, 2012; http://www.psmag.com/business-economics/identity-protection-that-really-clicks-42048/.

Jorgensen, Zach; Yu, Ting; "On Mouse Dynamics as a Behavioral Biometric for Authentication"; 2011; pp. 476-482; Department of Computer Science, North Carolina State University; Releigh, North Carolina.

Riva, Oriana; Qin, Chuan; Strauss, Karin; Lymberopoulos, Dimitrios; "Progressive authentication: deciding when to authenticate on mobile phones"; Microsoft Research; Aug. 8, 2012; http://research.microsoft.com/apps/pubs/default.aspx?id=168102.

* cited by examiner

822

834
CONVERTING THE ONE OR MORE FIRST INDICATORS THAT CORRESPOND TO A FIRST FORM OF INTERACTION WITH A SERVICE TO THE ONE OR MORE SECOND INDICATORS THAT CORRESPOND TO A SECOND FORM OF INTERACTION WITH THE SERVICE, THE FIRST FORM OF INTERACTION DIFFERENT FROM THE SECOND FORM OF INTERACTION

836
CONVERTING THE ONE OR MORE FIRST INDICATORS THAT CORRESPOND TO A BROWSER FORM OF INTERACTION WITH THE SERVICE TO THE ONE OR MORE SECOND INDICATORS THAT CORRESPOND TO A SERVICE-SPECIFIC APP FORM OF INTERACTION WITH THE SERVICE

838
CONVERTING THE ONE OR MORE FIRST INDICATORS THAT CORRESPOND TO A FIRST PAYMENT TYPE VIA THE FIRST USER DEVICE TO THE ONE OR MORE SECOND INDICATORS THAT CORRESPOND TO A SECOND PAYMENT TYPE VIA THE SECOND USER DEVICE, THE FIRST PAYMENT TYPE DIFFERENT FROM THE SECOND PAYMENT TYPE

840
CONVERTING THE ONE OR MORE FIRST INDICATORS THAT CORRESPOND TO A NEAR FIELD COMMUNICATION (NFC) PAYMENT TYPE VIA THE FIRST USER DEVICE TO THE ONE OR MORE SECOND INDICATORS THAT CORRESPOND TO A DISPLAYED VISUAL CODE PAYMENT TYPE VIA THE SECOND USER DEVICE

842
CONVERTING THE ONE OR MORE FIRST INDICATORS THAT CORRESPOND TO A FIRST LEVEL OF GEOGRAPHICAL POSITIONING PRECISION WITH RESPECT TO THE FIRST USER DEVICE TO THE ONE OR MORE SECOND INDICATORS THAT CORRESPOND TO A SECOND LEVEL OF GEOGRAPHICAL POSITIONING PRECISION WITH RESPECT TO THE SECOND USER DEVICE, THE FIRST LEVEL DIFFERENT FROM THE SECOND LEVEL

MULTI-DEVICE BEHAVIORAL FINGERPRINTING

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS (1) For purposes of the USPTO extra-statutory requirements, the present application claims benefit of priority of U.S. Provisional Patent Application No. 61/632,836, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Sep. 24, 2011, which was filed within the twelve months preceding the filing date of the present application or is an application of which a currently co-pending application is entitled to the benefit of the filing date.

(2) For purposes of the USPTO extra-statutory requirements, the present application claims benefit of priority of U.S. Provisional Patent Application No. 61/572,309, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Oct. 13, 2011, which was filed within the twelve months preceding the filing date of the present application or is an application of which a currently co-pending application is entitled to the benefit of the filing date.

(3) For purposes of the USPTO extra-statutory requirements, the present application constitutes a continuation-in-part of U.S. patent application Ser. No. 13/373,685, entitled "Behavioral Fingerprint Device Identification", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(4) For purposes of the USPTO extra-statutory requirements, the present application constitutes a continuation-in-part of U.S. patent application Ser. No. 13/373,684, entitled "Behavioral Fingerprint Controlled Automatic Task Determination", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(5) For purposes of the USPTO extra-statutory requirements, the present application constitutes a continuation-in-part of U.S. patent application Ser. No. 13/373,680, entitled "Behavioral Fingerprint Controlled Theft Detection and Recovery", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(6) For purposes of the USPTO extra-statutory requirements, the present application constitutes a continuation-in-part of U.S. patent application Ser. No. 13/373,677, entitled "Trust Verification Schema Based Transaction Authorization", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(7) For purposes of the USPTO extra-statutory requirements, the present application constitutes a continuation-in-part of U.S. patent application Ser. No. 13/373,682, entitled "Social Network Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Nov. 23, 2011, which is currently co-pending or is an application of which a currently co-pending application is entitled to the benefit of the filing date.

(8) For purposes of the USPTO extra-statutory requirements, the present application constitutes a continuation-in-part of U.S. patent application Ser. No. 13/475,564, entitled "Behavioral Fingerprint Based Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed May 18, 2012, which is currently co-pending or is an application of which a currently co-pending application is entitled to the benefit of the filing date.

(9) For purposes of the USPTO extra-statutory requirements, the present application constitutes a continuation-in-part of U.S. patent application Ser. No. 13/538,385, entitled "Network Acquired Behavioral Fingerprint for Authentication", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Jun. 29, 2012, which is currently co-pending or is an application of which a currently co-pending application is entitled to the benefit of the filing date.

(10) For purposes of the USPTO extra-statutory requirements, the present application constitutes a continuation-in-part of U.S. patent application Ser. No. 13/552, 502, entitled "Relationship Based Trust Verification Schema", naming Marc E. Davis, Matthew G. Dyor, Daniel A. Gerrity, Xuedong (XD) Huang, Roderick A. Hyde, Royce A. Levien, Richard T. Lord, Robert W. Lord, Mark A. Malamud, Nathan Myhrvold, and Clarence T. Tegreene as inventors, filed Jul. 18, 2012, which is currently co-pending or is an application of which a currently co-pending application is entitled to the benefit of the filing date.

The United States Patent and Trademark Office (USPTO) has published a notice to the effect that the USPTO's computer programs require that patent applicants both reference a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of certain ones of its parent applications as set forth above, but expressly points out that such designations are not to be construed in any way as any type of commentary and/or admission as to whether or not the present application contains any new matter in addition to the matter of its parent application(s).

BRIEF DESCRIPTION OF THE FIGURES

FIGS. 8B-8J depict example additions or alternatives for a flow diagram of FIG. 8A in accordance with certain example embodiments.

DETAILED DESCRIPTION

Figure 1:
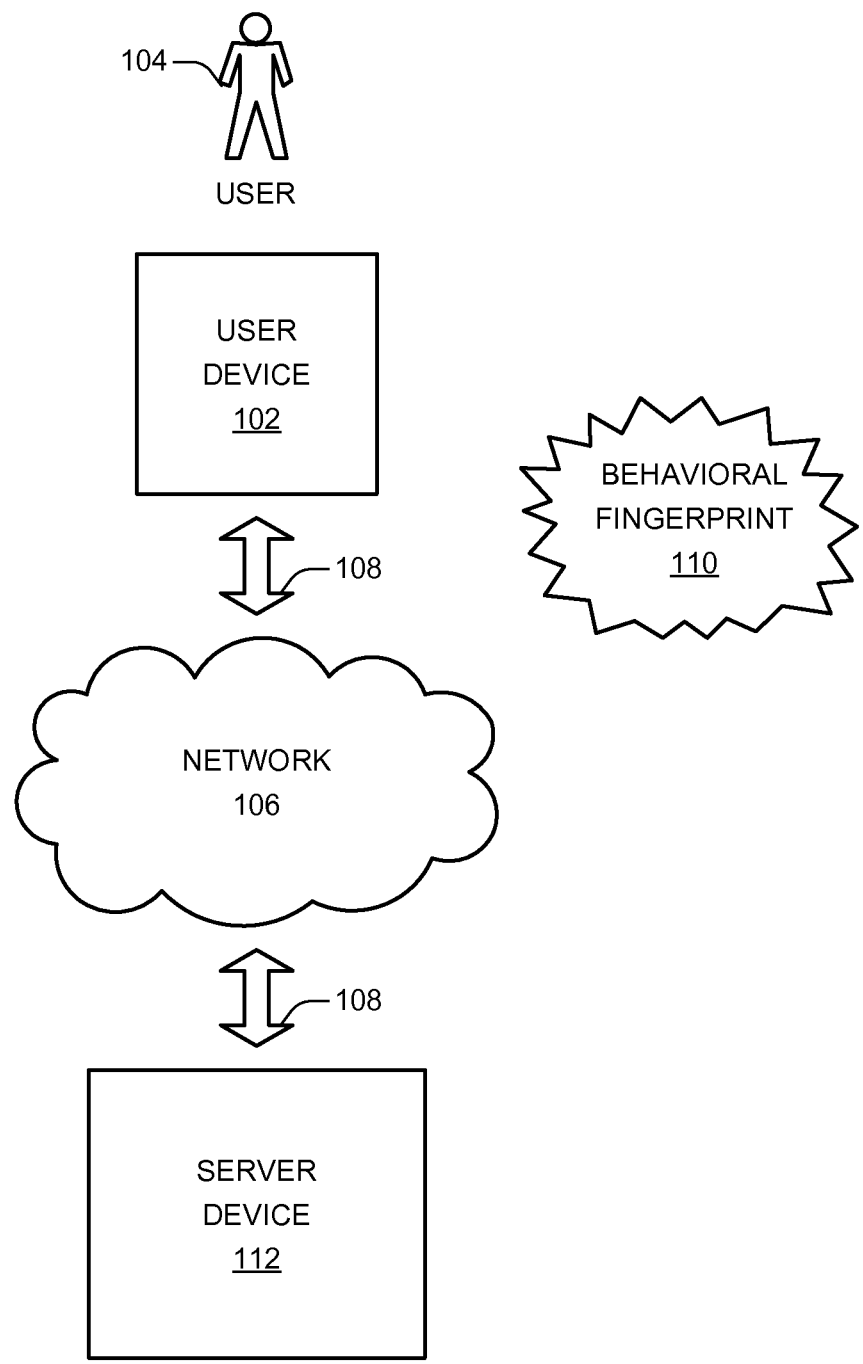
FIG. 1 is a schematic diagram of a user device, a server device, and at least one behavioral fingerprint, any of which may be involved individually or jointly in example authentication scenarios in accordance with certain example embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 is a schematic diagram 100 of a user device, a server device, and at least one behavioral fingerprint, any of which may be involved individually or jointly in example authentication scenarios in accordance with certain example embodiments. As shown in FIG. 1, by way of example but not limitation, schematic diagram 100 may include at least one user device 102, at least one user 104, at least one network 106, at least one channel 108, at least one behavioral fingerprint 110, or at least one server device 112. More specifically, at least one channel 108 may extend from or lead to a device 102 or 112 to facilitate communication therewith.

For certain example embodiments, a user 104 may correspond to or be utilizing at least one user device 102. A user 104 may utilize a user device 102 in accordance with a usage that may be at least partially represented by, modeled by, incorporated into, stored at, tracked by, summarized in, a combination thereof, etc. at least one behavioral fingerprint 110. A user device 102 may comprise, by way of example but not limitation, a mobile phone, a smart phone, a mobile terminal, a laptop or notebook computer, a personal digital assistant (PDA), a netbook, an entertainment appliance (e.g., a television, a gaming console, a set-top box, a music player, a combination thereof, etc.), a portable gaming device, a user equipment, a tablet or slate computer, a desktop computer, a personal navigation device (PND), a vehicle with user-accessible computational capabilities, videoconferencing equipment, some combination thereof, or so forth or so forth. A user 104 may comprise, by way of example only, at least one person, a couple, siblings, a family, a partnership, an organizational group, a company, a portion thereof, some combination thereof, or so forth or so forth. However, claimed subject matter is not limited to any particular described embodiments, implementations, examples, etc.

For certain example embodiments, a network 106 may comprise, by way of example but not limitation, at least a portion of one or more networks having one or more nodes that transmit, receive, forward, generate, buffer, store, route, switch, process, a combination thereof, etc. one or more messages, packets, signals, waves, voltage or current levels, some combination thereof, or so forth. A network may comprise, by way of example but not limitation, one or more of: a wireless network, a wired network, an internet, an intranet, a public network, a private network, a packet-switched network, a circuit-switched network, an ad hoc network, an infrastructure network, a public-switched telephone network (PSTN), a cable network, a cellular network, a satellite network, a fiber optic network, some combination thereof, or so forth. A node may comprise, by way of example but not limitation, a server; a router; an end user device, such as a mobile phone, a tablet computer, a desktop computer, an entertainment appliance, a vehicle, a combination thereof, etc.; a switch; a base station; a gateway; some combination thereof; or so forth. However, claimed subject matter is not limited to any particular described embodiments, implementations, examples, etc.

For certain example embodiments, a channel 108 may comprise, by way of example but not limitation, one or more of: at least one wired link, at least one wireless link, at least part of public network, at least part of a private network, at least part of a packet-switched network, at least part of a circuit-switched network, at least part of an infrastructure network, at least part of an ad hoc network, at least part of a PSTN, at least part of a cable network, at least part of a cellular network connection, at least part of an Internet connection, at least part of a Wi-Fi connection, at least part of a WiMax connection, at least part of an internet backbone, at least part of a satellite network, at least part of a fiber optic network, multiple instances of any of the above, one or more network nodes, some combination of the above, or so forth. A channel 108 may include one or more nodes (e.g., a telecommunication node, an access point, a base station, an internet server, a gateway, an internet or telecommunications switch, a combination thereof, etc.) through which signals are propagated. A communication may comprise, by way of example but not limitation, a transmission of data, a reception of data, an exchange of data, a flow of data (e.g., between or among two or more intermediate nodes or endpoints), some combination thereof, or so forth. A user device 102 may communicate with a server device 112, or vice versa, via one or more signals (not explicitly shown) using one or more channels 108. A couple of examples of channels 108 are illustrated in schematic diagram 100 (as well as in additional figures, such as schematic diagram 200A of FIG. 2A). Signals may propagate via one or more channels 108. Signals, by way of example but not limitation, may comprise, electrical signals, magnetic signals, electromagnetic signals, photonic signals, wireless signals, wired signals, multiples ones thereof, some combination thereof, or so forth. However, claimed subject matter is not limited to any particular described embodiments, implementations, examples, etc.

For certain example embodiments, a server device 112 may comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof, or so forth. However, claimed subject matter is not limited to any particular described embodiments, implementations, examples, etc.

For certain example embodiments, at least one behavioral fingerprint 110 may comprise, by way of example but not limitation, one or more indicators representing one or more behaviors of at least one user with respect to at least one user device. Examples of one or more indicators representing one or more behaviors of at least one user with respect to at least one user device may include, but are not limited to, one or more indicators representing one or more habits of at least one user with respect to at least one user device, one or more indicators representing usage of at least one user device by at least one user, one or more indicators representing one or more actions of at least one user with respect to at least one user device, some combination thereof, or so forth. Additionally or alternatively, at least one behavioral fingerprint 110 may comprise, by way of example but not limitation, one or more indicators representing one or more predicted acts (e.g., behaviors, such as habits, usages, actions, a combination thereof, etc.) of at least one user with respect to at least one device. Additionally or alternatively, at least one behavioral fingerprint 110 may comprise, by way of example but not limitation, at least one status of a user that is utilizing or that corresponds to a user device. For certain example implementations, a user whose behavior is being monitored to at least partially establish at least a portion of at least one behavioral fingerprint 110 may comprise an authorized user, which is described herein below. However, claimed subject matter is not limited to any particular described embodiments, implementations, examples, etc.

For certain example embodiments, a user may be utilizing a user device, by way of example but not limitation, if the user is accessing the user device, if the user is interacting with the user device, if the user is carrying the user device, if the user is providing input to the user device, if the user is receiving output from the user device, if the user is directing operation of the user device, some combination thereof, or so forth. A user may correspond to a user device, by way of example but not limitation, if the user is an authorized user of the user device. However, claimed subject matter is not limited to any particular described embodiments, implementations, examples, etc.

For certain example embodiments, a user 104 of a user device 102 may comprise an authorized user of the user device 102: if the user 104 comprises, by way of example but not limitation, a true owner, a manager, an information technology (IT) specialist, a controller, a purchaser, a lessee, an approved borrower, a primary user, a combination thereof, etc. of the user device 102; if the user 104 is or has been authorized by a true owner, a manager, an IT specialist, a controller, a purchaser, a lessee, an approved borrower, a primary user, a combination thereof, etc. of the user device 102; some combination thereof; or so forth. In certain example implementations, a determination that a user 104 comprises (e.g., is, is becoming, is being designated, a combination thereof, etc.) an authorized user of a user device 102: may be effectuated if or when a user first registers a profile, an account, a combination thereof, etc. on a device (e.g., after a purchase or a 'hard' reset); may be effectuated if or when one or more 'sign-ins' (e.g., entry of a password, code, PIN, pattern, biometric input, a combination thereof, etc.) are performed by a user; may be effectuated if or when one or more user ID/secret information combinations (e.g., entry of an account name, email address, individualized identification, a combination thereof, etc. along with a corresponding password, code, PIN, pattern, biometric input, a combination thereof, etc.) are entered by a user; may be effectuated if or when a given user is identified as, designated as, or otherwise indicated to comprise an authorized user by one who is already an authorized user; some combination of such authorized user determinations; or so forth. An authorized user may add a new authorized user, by way of example only: by providing a name or other identification of another user or his or her biometric information (e.g., a facial photo, a voice sample, a fingerprint image, a retinal scan, a combination thereof, etc.); by providing a name or other identification of a user or temporary or permanent secret information, such as a password, a code, a PIN, a pattern, biometric input, a combination thereof, etc. (e.g., that a newly authorized user may be capable of changing or confirming); some combination thereof; or so forth. An authorized user, such as a true owner or IT specialist, may be empowered to remove someone from a list of authorized user(s). In certain example embodiments, different authorized users may have different levels of authorization (e.g., different levels of access, capabilities, rights, privileges, a combination thereof, etc.) with respect to a given user device 102. For certain example implementations, but by way of example only, one authorized user may comprise an administrator with full access rights or privileges, yet another authorized user may comprise a regular, non-administrative, or junior user with fewer access rights or privileges. Additionally or alternatively, one authorized user may have full access rights to applications and content stored on a device or associated with a particular account/profile, yet another authorized user may have restricted access rights to applications or content stored on a device such that access is prevented, for instance, to particular device settings or adult content. Other approaches to providing different levels of authorization may also or instead be implemented. By way of example only, an authorized user who is a true owner may add a new authorized user that is permitted to utilize existing applications and content but is prohibited from adding new applications or making particular purchases (e.g., individual purchases above a predetermined dollar amount or multiple purchases beyond a total dollar amount).

Figure 2A:
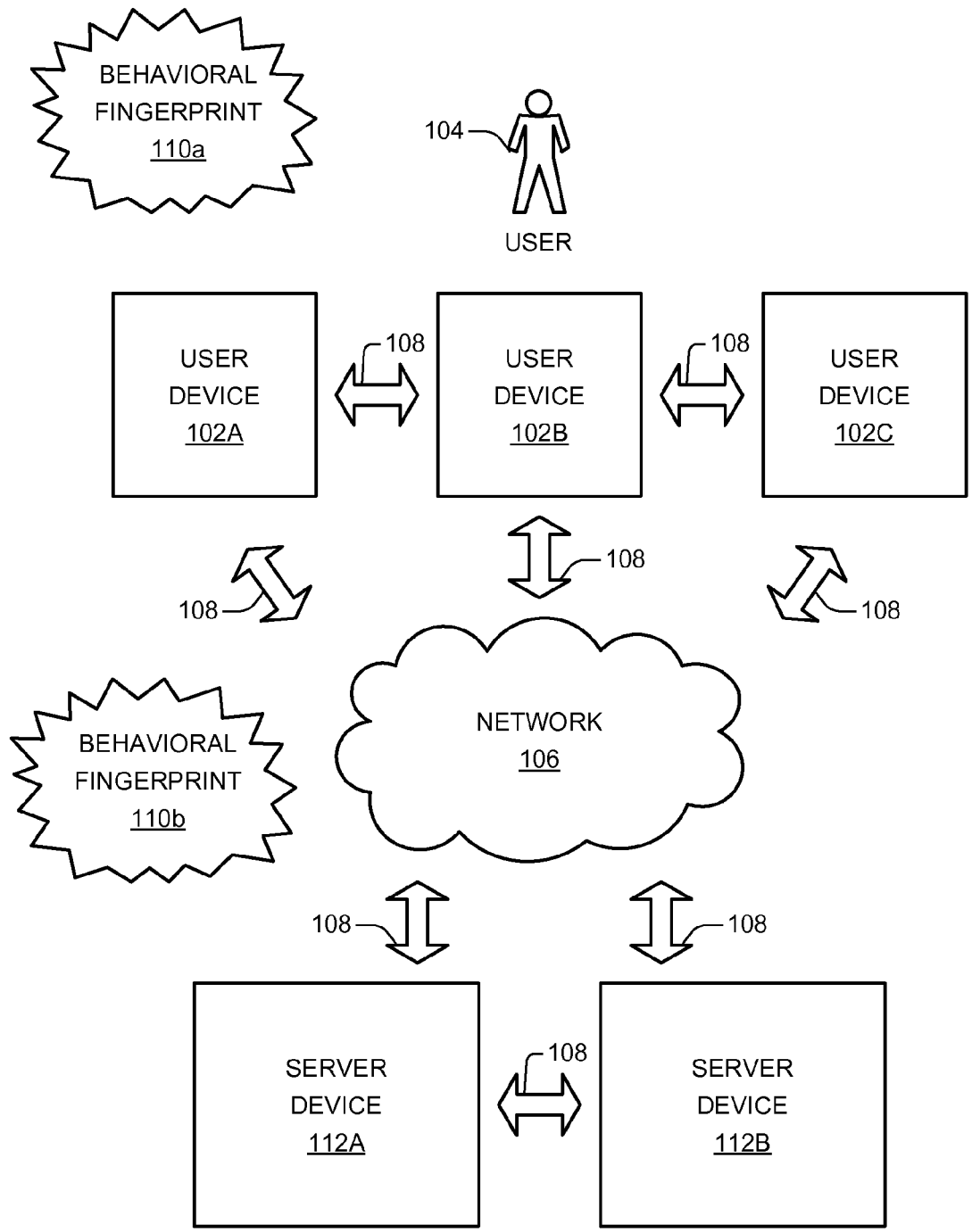
FIG. 2A is a schematic diagram of multiple user devices, multiple server devices, and at least one behavioral fingerprint, any of which may be involved individually or jointly in example authentication scenarios in accordance with certain example embodiments.

FIG. 2A is a schematic diagram 200A of multiple user devices, multiple server devices, and at least one behavioral fingerprint, any of which may be involved individually or jointly in example authentication scenarios in accordance with certain example embodiments. As shown in FIG. 2A, by way of example but not limitation, schematic diagram 200A may include at least one user device 102, at least one user 104, at least one network 106, at least one channel 108, at least one behavioral fingerprint 110, or at least one server device 112. More specifically, schematic diagram 200A may include, by way of example only, three user devices 102 (a user device 102A, a user device 102B, or a user device 102C, etc.), two server devices 112 (a server device 112A, or a server device 112B, etc.), or two behavioral fingerprints 110 (a behavioral fingerprint 110a, or a behavioral fingerprint 110b, etc.).

For certain example embodiments, a user 104 may correspond to or be utilizing multiple user devices 102, such as at least two of user device 102A, user device 102B, or user device 102C, at least partially simultaneously or from time to time. By way of example only, a user 104 may own at least two of: a mobile phone, a tablet computer, a vehicle with an intelligent computing apparatus, a laptop computer, or a desktop computer. For certain example implementations, at least part of a combined behavioral fingerprint 110 (e.g., a behavioral fingerprint 110a/110b) may be associated with a user 104 and each corresponding user device 102. Additionally or alternatively, an individualized behavioral fingerprint 110 (e.g., a behavioral fingerprint 110a or a behavioral fingerprint 110b) may be associated with a user 104 and each corresponding individual or respective user device 102. However, claimed subject matter is not limited to any particular described embodiments, implementations, examples, etc.

For certain example embodiments, a behavioral fingerprint 110, 110a, or 110b; an at least partially combined instantiation of at least two of a behavioral fingerprint 110, 110a, or 110b; a portion of a behavioral fingerprint 110, 110a, or 110b; a combination thereof; etc. may be distributed across or stored at, by way of example only, one or more of: a user device 102A, a user device 102B, a user device 102C, a network 106 or node thereof, a server device 112A, a server device 112B, some combination thereof, or so forth. Additionally or alternatively, a behavioral fingerprint 110, 110a, or 110b; an at least partially combined instantiation of at least two of a behavioral fingerprint 110, 110a, or 110b; a portion of a behavioral fingerprint 110, 110a, or 110b; a combination thereof; etc. may be transmitted, received, exchanged, a combination thereof, etc., by way of example only, via one or more of: at least one network 106, one or more channels 108, some combination thereof, or so forth. A user device 102 or a server device 112 may transmit, receive, exchange, a combination thereof, etc. at least a portion of a behavioral fingerprint 110, 110a, or 110b directly between or among devices 102 or 112 or indirectly via at least one node (not explicitly shown) of one or more networks 106. However, claimed subject matter is not limited to any particular described embodiments, implementations, examples, etc.

Figure 2B:
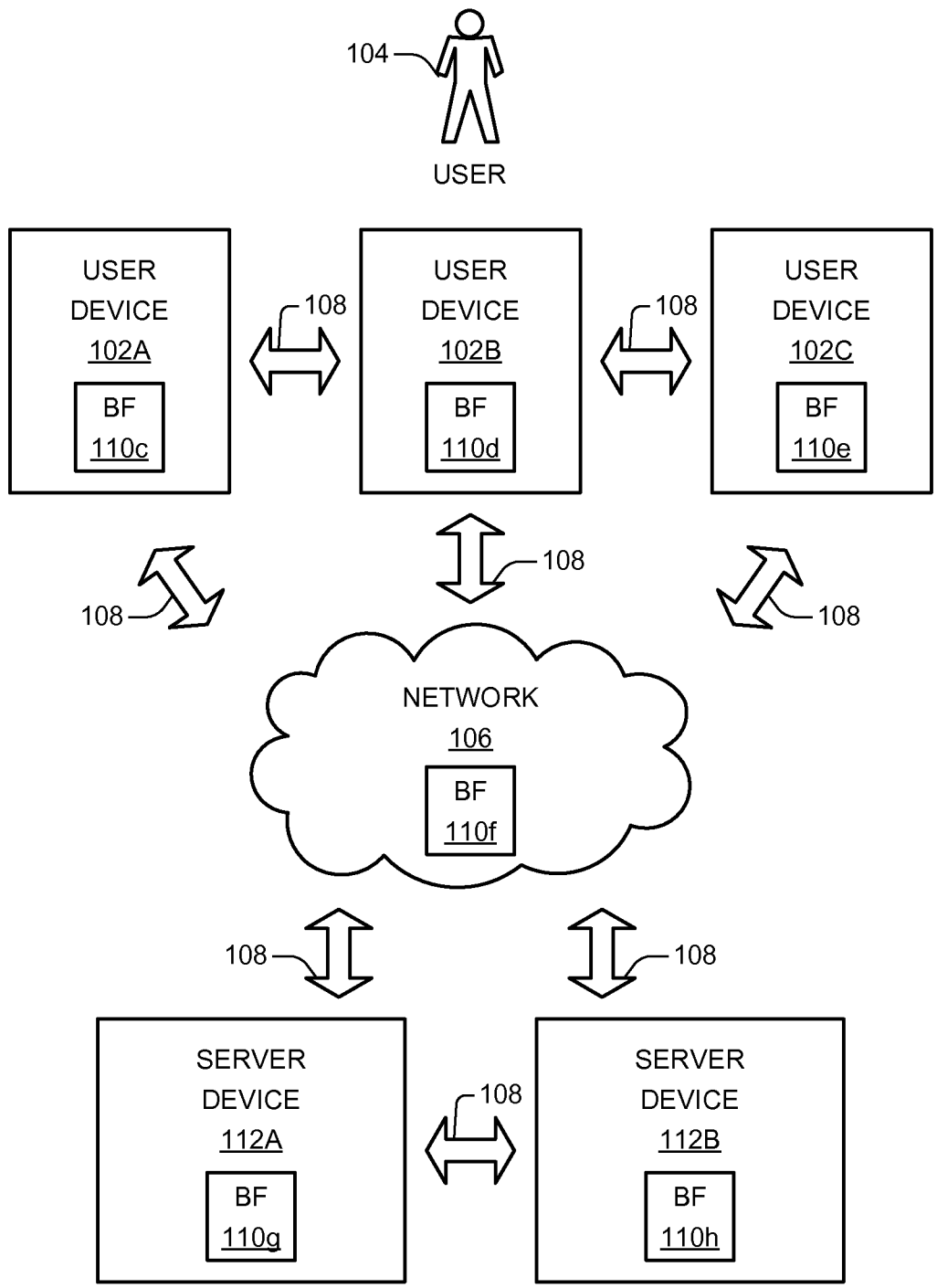
FIG. 2B is a schematic diagram of multiple user devices, multiple server devices, and multiple example locations for at least a portion of at least one behavioral fingerprint in accordance with certain example embodiments.

FIG. 2B is a schematic diagram 200B of multiple user devices, multiple server devices, and multiple example locations for at least a portion of at least one behavioral fingerprint in accordance with certain example embodiments. As shown in FIG. 2B, by way of example but not limitation, schematic diagram 200B may include at least one user device 102, at least one user 104, at least one network 106, at least one channel 108, at least one behavioral fingerprint 110, or at least one server device 112. More specifically, schematic diagram 200B may include, by way of example only, three user devices 102 (e.g., a user device 102A, a user device 102B, or a user device 102C, etc.), two server devices 112 (e.g., a server device 112A, or a server device 112B, etc.), or six behavioral fingerprints 110 (e.g., a behavioral fingerprint 110c, a behavioral fingerprint 110d, a behavioral fingerprint 110e, a behavioral fingerprint 110f, a behavioral fingerprint 110g, or a behavioral fingerprint 110h, etc.).

For certain example embodiments, a given behavioral fingerprint 110 or portion thereof may be located at (stored at, distributed at least partially across, accessible from, associated with, a combination thereof, etc.) one or more devices 102 or 112. By way of example only, a behavioral fingerprint 110c may be located at a user device 102A, a behavioral fingerprint 110d may be located at a user device 102B, a behavioral fingerprint 110e may be located at a user device 102C, a behavioral fingerprint 110f may be located at a network 106 (e.g., at a cloud service or system), a behavioral fingerprint 110g may be located at a server device 112A, or a behavioral fingerprint 110h may be located at a server device 112B. For certain example implementations, any one or more of behavioral fingerprints 110c-110h may comprise one or more separate or individualized behavioral fingerprints 110; may comprise one or more combined, amalgamated, distributed, a combination thereof, etc. behavioral fingerprints 110; may comprise at least a portion of at least one behavioral fingerprint 110; some combination thereof; or so forth. However, claimed subject matter is not limited to any particular described embodiments, implementations, examples, etc.

For certain example embodiments, at least one behavioral fingerprint 110 (e.g., of behavioral fingerprints 110c-110h) may be associated with at least one user 104 or one or more of user devices 102A, 102B, or 102C. For certain example implementations, a behavioral fingerprint 110c, which may be stored at a user device 102A, may be associated with a user 104 and user device 102A. For certain example implementations, a behavioral fingerprint 110g, which may be stored at a server device 112A, may be associated with a user 104 and a user device 102A. For certain example implementations, a behavioral fingerprint 110h, which may be stored at a server device 112B, may be associated with a user 104, a user device 102B, and a user device 102C. For certain example implementations, a behavioral fingerprint 110c, which may be stored at a user device 102A and associated therewith, and a behavioral fingerprint 110d, which may be stored at a user device 102B and associated therewith, may be individually or jointly associated with a user 104. A behavioral fingerprint 110c and a behavioral fingerprint 110d may be identical to each other, partially the same, different from one another, updated to keep one at least partially coherent or consistent with the other, some combination thereof, or so forth. For certain example implementations, a behavioral fingerprint 110d, which may be stored at a user device 102B and associated therewith, and a behavioral fingerprint 110g, which may be stored at a server device 112A and associated with a user device 102C, may be individually or jointly associated with a user 104. A behavioral fingerprint 110d and a behavioral fingerprint 110g may be identical to each other, partially the same, different from one another, updated to keep one at least partially coherent or consistent with the other, some combination thereof, or so forth. For certain example implementations, a behavioral fingerprint 110e, which may be stored at a user device 102C and associated therewith, and a behavioral fingerprint 110h, which may be stored at a server device 112b and also associated with user device 102C, may be individually or jointly associated with a user 104. A behavioral fingerprint 110e and a behavioral fingerprint 110h may be identical to each other, partially the same, different from one another, updated to keep one at least partially coherent or consistent with the other, some combination thereof, or so forth. For certain example implementations, a behavioral fingerprint 110e, which may be stored at a user device 102C, may be associated with a user 104 and a user device 102б. Although each user device 102 and server device 112 (and network 106) is shown in schematic diagram 200B as having a behavioral fingerprint 110 located there at, one or more user devices 102 or server devices 112 (or networks 106) may alternatively not have a behavioral fingerprint 110 located there at. Furthermore, other additional or alternative approaches may instead be implemented.

For certain example embodiments, a behavioral fingerprint 110 (including but not limited to any one or more of behavioral fingerprints 110a-110h) may comprise a whole behavioral fingerprint, a portion of a behavioral fingerprint, a behavioral fingerprint associated with a single user device, a behavioral fingerprint associated with multiple user devices, a part of a distributed behavioral fingerprint, a whole behavioral fingerprint that is distributed across multiple devices, a portion or a whole behavioral fingerprint that is located at one device, one or more indicators of one or more behavior-related acts, some combination thereof, or so forth. Examples of behavioral fingerprint(s) 110 are described further herein below with particular reference to FIG. 3. However, claimed subject matter is not limited to any particular described embodiments, implementations, examples, etc.

Figure 3:
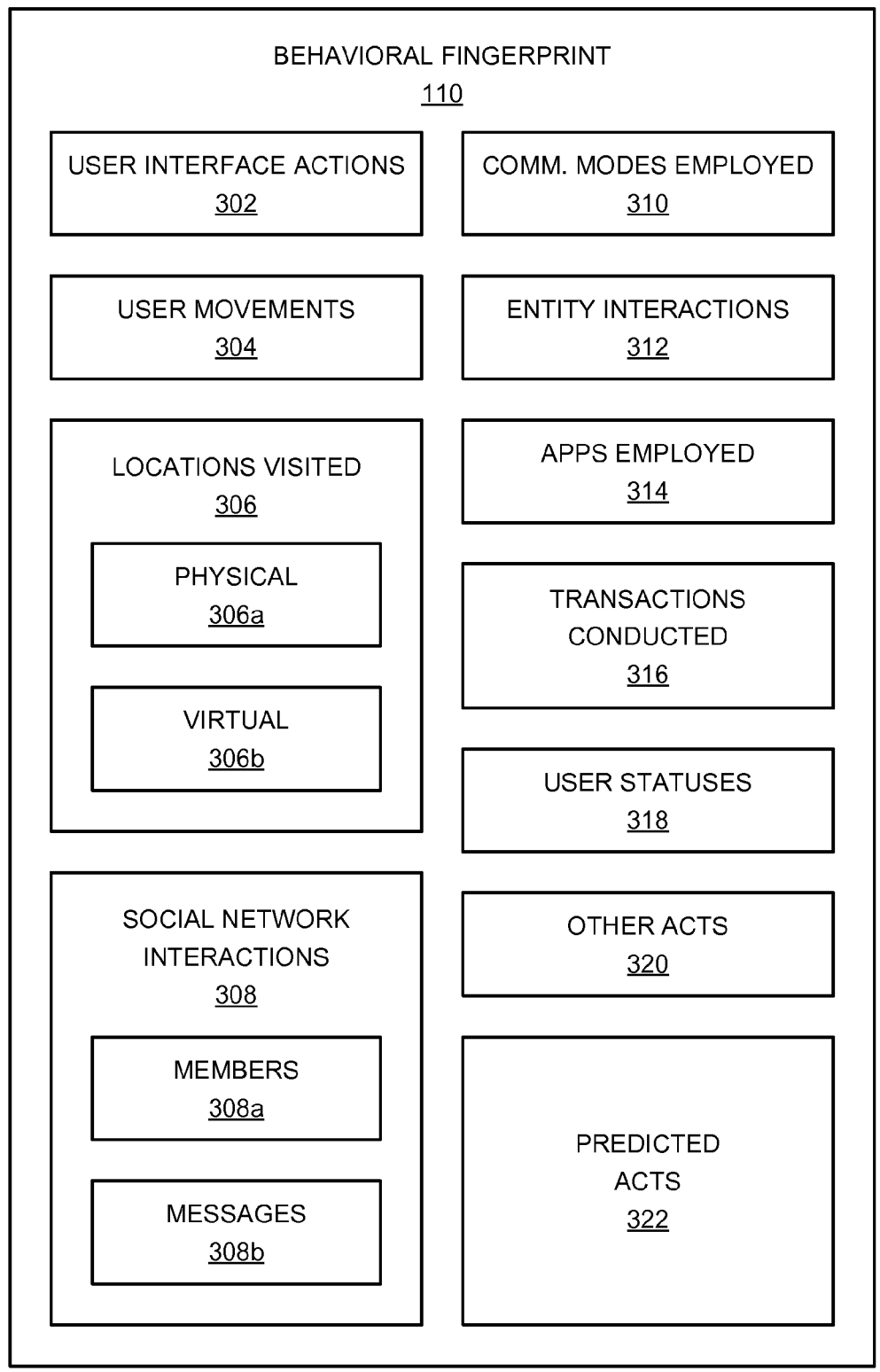
FIG. 3 is a schematic diagram illustrating an example behavioral fingerprint including one or more example indicators of one or more behavior-related acts in accordance with certain example embodiments.

FIG. 3 is a schematic diagram 300 illustrating an example behavioral fingerprint including one or more example indicators of one or more behavior-related acts in accordance with certain example embodiments. As shown in FIG. 3, by way of example but not limitation, schematic diagram 300 may comprise a behavioral fingerprint 110, which behavioral fingerprint 110 may include any one or more of indications of various acts 302-322. Example indications 302-322 that are illustrated may include, but are not limited to, user interface actions 302, user movements 304, locations visited 306, social network interactions 308, communication modes employed 310, entity interactions 312, apps employed 314, transactions conducted 316, user statuses 318, other acts 320, predicted acts 322, some combination thereof, or so forth.

More specifically, locations visited 306 may include physical locations visited 306a, virtual locations visited 306b, a combination thereof, etc., or social network interactions 308 may include social network members 308a, social network messages 308b, a combination thereof, etc. Additional or alternative implementations to those of schematic diagram 300 for a behavioral fingerprint 110 are described further herein below as well as above. Moreover, a behavioral fingerprint 110 may alternatively include more, fewer, or different indication(s) from those that are illustrated without departing from claimed subject matter.

For certain example embodiments, one or more user interface actions 302 may include, but are not limited to, a type of user interaction (e.g., buttons, keys, physical keyboard, touch screen, swipes, virtual buttons, virtual keyboard, multi-finger touch, speech, textual, movement sensing input such as a shake or a twist, a combination thereof, etc.), a speed of user interaction (e.g., speech rate, speech cadence, typing speed, swiping speed, scrolling speed, speed moving between or among windows or apps, duration of a swipe or press of a virtual or physical key or button, a combination thereof, etc.), a user input apparatus (e.g., a built-in microphone, a wireless microphone, a built-in keyboard, a virtual keyboard, a detachable/attachable keyboard, a wireless keyboard, an input apparatus identifiable such as by name or number, a combination thereof, etc.), a position of user interaction (e.g., a location of touch for a touch-sensitive screen having a keyboard or button or swipe area, a location of a swipe, a length of a swipe, an offset from a designated key or slide area, a combination thereof, etc.), a user output apparatus (e.g., a screen, a built-in speaker, a separate speaker, a vibration unit, an integrated output apparatus, a wired output apparatus, a wireless output apparatus, an output apparatus identifiable such as by name or number, a combination thereof, etc.), some combination thereof, or so forth. However, claimed subject matter is not limited to any particular described embodiments, implementations, examples, etc.

For certain example embodiments, one or more user movements 304 may include, but are not limited to, device orientation (e.g., cardinal direction a device is pointed at, angle a device is held at, a combination thereof, etc.), device shakes or deformations (e.g., how a device is moved to provide input, how a device is pressed or twisted or curved to provide input, a combination thereof, etc.), a pattern of vibrations or jostling applied to or experienced by a device during daily use (e.g., as a result of carrying it, commuting with it, placing it in a pack or purse, placing it in a pocket, a combination thereof, etc.), some combination thereof, or so forth. However, claimed subject matter is not limited to any particular described embodiments, implementations, examples, etc.

For certain example embodiments, one or more locations visited 306 may include, but are not limited to, locations that a user carries, sends, places, or travels with a device; locations that a user directs software to acquire data from or send data to; some combination thereof; or so forth. For certain example implementations, physical locations visited 306a may include, but are not limited to, an address, a room, a store, a building, a neighborhood, a city, a state, a country, one or more satellite positioning system (SPS) coordinates, a check-in location, a business, one or more geographical (e.g., cardinal) coordinates, a geographical zone (e.g., coordinates or approximate position in conjunction with a distance or range), some combination thereof, or so forth. For certain example implementations, virtual locations visited 306b may include, but are not limited to, an internet address, a web page, a web site, a social network, a destination within a social network, a virtual world, a destination within a virtual world, a chat room, a bulletin board, a blog, some combination thereof, or so forth. However, claimed subject matter is not limited to any particular described embodiments, implementations, examples, etc.

For certain example embodiments, one or more social network interactions 308 may include, but are not limited to, accessing a social network, reading a communication from one or more social network members, sending a communication to one or more social network members, changing profile or account information for a social network, viewing publicly-available social network information (e.g., viewing a person's wall, board, stream, pinning, a combination thereof, etc.), viewing private social network information (e.g., viewing a targeted or personalized message, tweet, picture, a combination thereof, etc.), searching for entities on a social network, playing games via a social network, experiencing entertainment (e.g., video, audio, clips, pictures, a combination thereof, etc.) via a social network, a listing of which social network(s) are accessed, an order of which social networks are accessed, a day or time of accessing particular social network(s), some combination thereof, or so forth. For certain example implementations, social network member interactions 308a may include, but are not limited to, identifying or listing members interacted with via receiving, retrieving, sending, replying to a combination thereof, etc. one or more communications; noting particular social network protocols or modes (e.g., wall writing or viewing, tweet sending or receiving, picture sending or viewing, public versus private communicating, a combination thereof, etc.) used to communicate with particular members individually or in groups; noting particular social network protocols or modes used to communicate with particular member groups; some combination thereof; or so forth. For certain example implementations, social network message interactions 308b may include, but are not limited to, noting (e.g., recording, memorializing, storing, identifying, a combination thereof, etc.) messages sent or received, noting an order of message sending or viewing, noting a type (e.g., a social network protocol) of message sent or received, noting a number of messages sent or received, noting a duration between arrival of a message (e.g., generally or from a particular member) and viewing of the message, noting a duration between arrival or viewing of a message (e.g., generally or from a particular member) and responding to the message, some combination thereof, or so forth. However, claimed subject matter is not limited to any particular described embodiments, implementations, examples, etc.

For certain example embodiments, one or more communication modes employed 310 may include, but are not limited to, speech, a phone call, a voice-over-internet-protocol (VoIP) communication, text messaging, instant messaging, a video communication (e.g., a video call, a video conference, a combination thereof, etc.), a social-network-based communication (e.g., a communication that is effectuated at least partially using a social network app, web site, service, a combination thereof, etc.), some combination thereof, or so forth. Additionally or alternatively, one or more communication modes employed 310 may include, but are not limited to, indications of which communication mode is employed if/when responding to a received communication of a given communication mode (e.g., it may be noted that an authorized user may respond to most phone calls or phone calls from particular people with text messages). However, claimed subject matter is not limited to any particular described embodiments, implementations, examples, etc.

For certain example embodiments, one or more entity interactions 312 may include, but are not limited to, identification of at least one entity (e.g., business, service, person, social network member, group, organization, a combination thereof, etc.) that a user interacts with (e.g., with or without an indication of a communication mode, such as via a telephone capability, via email, via instant messaging, via a social network communication protocol, via VoIP, via a video capability, via a speech capability, a combination thereof, etc.), a listing of entities interacted with, an order of entities interacted with, notations of when (e.g., a day, a time, days of week, a combination thereof, etc.) entities are interacted with, notations of how (e.g., a communication mode used, a duration, a combination thereof, etc.) entities are interacted with, some combination thereof, or so forth. However, claimed subject matter is not limited to any particular described embodiments, implementations, examples, etc.

For certain example embodiments, one or more apps employed 314 may include, but are not limited to, identification of one or more apps (e.g., applications, native applications, downloaded applications, installed applications, software applications, web applications, a combination thereof, etc.) employed (e.g., accessed, started, opened, launched, viewed, consulted, manipulated, configured, installed, executed, a combination thereof, etc.) by a user, a listing of apps employed, an order of apps employed, a notation of a time or a day at which apps are employed, a notation of duration(s) for which apps are employed, some combination thereof, or so forth. However, claimed subject matter is not limited to any particular described embodiments, implementations, examples, etc.

For certain example embodiments, one or more transactions conducted 316 may include, but are not limited to, an identification of transactions (e.g., exchanges of consideration, purchases, orders, downloads, a combination thereof, etc.) conducted (e.g., initiated, requested, consummated, effectuated, accomplished, monitored, a combination thereof, etc.), a list of transactions, a notation of times or days of transactions, a notation of transaction amounts, a notation of at least one party to one or more transactions, a notation of items (e.g., physical items such as food or electronics, virtual items such as songs or movies or games or in-game abilities, a combination thereof, etc.) or services (e.g., physical services such as a massage or a car wash, virtual services such as streaming media or a membership, a combination thereof, etc.) involved in one or more transactions, some combination thereof, or so forth. However, claimed subject matter is not limited to any particular described embodiments, implementations, examples, etc.

For certain example embodiments, one or more user statuses 318 may include, but are not limited to, a location status update, a health status update, an alert (e.g., as to whether a person has possession or has lost possession of a device; as to whether a device has exceeded some percentage—e.g. 50% or 75% or 100%—of an allotted amount, such as of minutes of talking, bytes of data, messages of texting, dollars of a fund, time of use, etc.; as to where a person is currently located; a combination thereof; etc.), a current (e.g., most recent, present, a combination thereof, etc.) activity update, some combination thereof, or so forth. However, claimed subject matter is not limited to any particular described embodiments, implementations, examples, etc.

For certain example embodiments, one or more other acts 320 may include, but are not limited to, other user behaviors, user habits, user actions, user movements, user interactions, user visitations, user transactions, device features (e.g., capabilities, native applications, operating system functions, a combination thereof, etc.) employed, a combination thereof, etc. that a device may monitor (e.g., detect, observe, discern, ascertain, a combination thereof, etc.); other acts reflecting user behavior; other acts described herein; some combination thereof; or so forth. However, claimed subject matter is not limited to any particular described embodiments, implementations, examples, etc.

For certain example embodiments, one or more predicted acts 322 may include, but are not limited to, an act that is predicted based at least partially on any one or more of other indications 302-320; an act that is predicted to be performed by an authorized user; an act corresponding to a particular likelihood level of re-occurring; an act that is predicted to re-occur in view of one or more observed acts of at least one authorized user of one or more user devices; an act that is predicted to occur based at least partially on a statistical analysis (e.g., a likelihood function, a histogram evaluation, a probabilistic approach, a Bayesian analysis, a stochastic mechanism, a correlation procedure, a probability density function, a normal/Gaussian distribution, a cumulative distribution function, an expected value, a combination thereof, etc.) of one or more historically-monitored acts; an act that has been repeatedly performed in certain manner(s) or at particular time(s) such that it can be expected to be performed again in such certain manner(s) or at such particular time(s); an act that is derived or results from a conversion of monitored act(s) corresponding to one device to at least one act corresponding to another device; some combination thereof; or so forth. However, claimed subject matter is not limited to any particular described embodiments, implementations, examples, etc.

Figure 4:
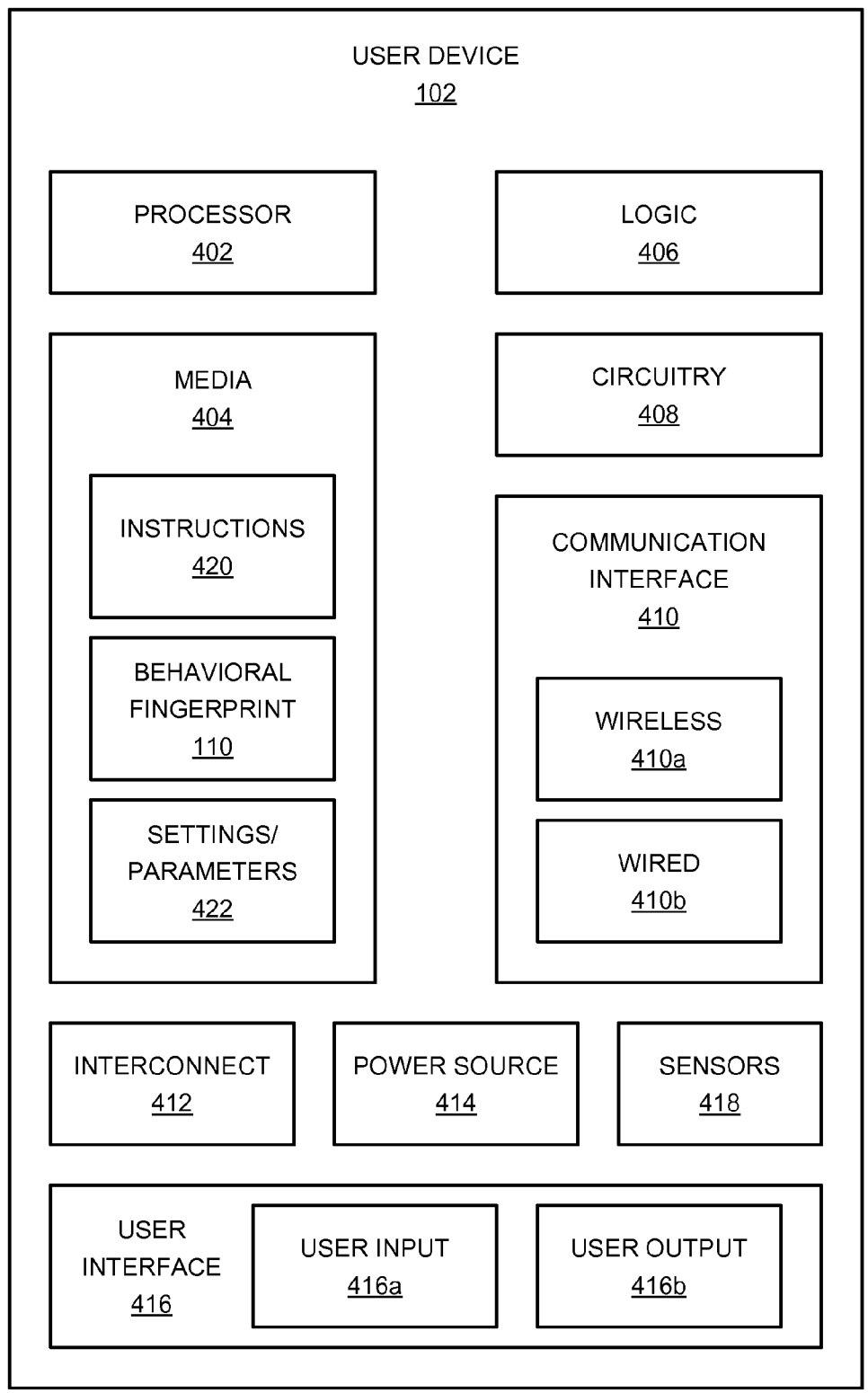
FIG. 4 is a schematic diagram of an example user device including one or more example components in accordance with certain example embodiments.

FIG. 4 is a schematic diagram 400 of an example user device including one or more example components in accordance with certain example embodiments. As shown in FIG. 4, a user device 102 may include one or more components such as: at least one processor 402, one or more media 404, logic 406, circuitry 408, at least one communication interface 410, at least one interconnect 412, at least one power source 414, at least one user interface 416, one or more sensors 418, some combination thereof, or so forth. Furthermore, as shown in schematic diagram 400, one or more media 404 may comprise one or more instructions 420, at least one behavioral fingerprint 110, one or more settings or parameters 422, some combination thereof, or so forth; a communication interface 410 may comprise at least one wireless communication interface 410a, at least one wired communication interface 410b, some combination thereof, or so forth; or a user interface 416 may comprise at least one user input interface 416a, at least one user output interface 416b, some combination thereof, or so forth. However, a user device 102 may alternatively include more, fewer, or different component(s) from those that are illustrated without departing from claimed subject matter.

For certain example embodiments, a user device 102 may include or comprise at least one electronic device. User device 102 may comprise, for example, a computing platform or any electronic device having at least one processor or memory. Processor 402 may comprise, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 404 may bear, store, contain, include, provide access to, a combination thereof, etc. instructions 420, which may be executable by a processor 402; at least one behavioral fingerprint 110; one or more settings/parameters 422; some combination thereof; or so forth. Instructions 420 may comprise, by way of example but not limitation, a program, a module, an application or app (e.g., that is native, that runs in a browser, that runs within a virtual machine, a combination thereof, etc.), an operating system, a combination thereof, etc. or portion thereof; operational data structures; source code, object code, just-in-time (JIT) compiled code, a combination thereof, etc.; processor-executable instructions; other code; some combination thereof; or so forth. Media 404 may comprise, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, a combination thereof, etc.) that is capable of bearing instructions, a behavioral fingerprint, settings, parameters, some combination thereof, or so forth.

For certain example embodiments, execution of instructions 420 by one or more processors 402 may transform user device 102 into a special-purpose computing device, apparatus, platform, machine, some combination thereof, or so forth. Instructions 420 may comprise, for example, instructions that are capable of realizing at least a portion of one or more flow diagrams, methods, processes, procedures, operations, functionality, technology, mechanisms, a combination thereof, etc. that are described herein or illustrated in the accompanying drawings. Settings/parameters 422 may comprise, by way of example but not limitation, one or more settings or parameters that may be established or determined by a user or other entity, one or more or settings or parameters that may be determined or detected by a user device 102, one or more settings or parameters that may be received from another device that determined or detected them, one or more settings or parameters that may determine at least partly how a user device 102 is to operate or respond to a situation or a behavioral fingerprint, one or more settings or parameters (e.g., values) that may be used to realize flow diagrams, methods, processes, procedures, operations, functionality, technology, mechanisms, a combination thereof, etc. that are described herein or illustrated in the accompanying drawings. Settings/parameters 422 may control at least partially how at least one behavioral fingerprint 110 is configured, stored, shared, used, applied, some combination thereof, or so forth. Additionally or alternatively, at least a portion of settings/parameters 422 may be at least partially integrated with at least one behavioral fingerprint 110.

For certain example embodiments, logic 406 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings. Circuitry 408 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings, wherein circuitry 408 comprises at least one physical or hardware component or aspect.

For certain example embodiments, one or more communication interfaces 410 may provide one or more interfaces between user device 102 and another device or a person/ operator. With respect to a person/operator, a communication interface 410 may include, by way of example but not limitation, a screen, a speaker, a keyboard or keys, a microphone, or other person-device input/output apparatuses. A wireless communication interface 410a or a wired communication interface 410b may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a combination thereof, etc.), a physical or logical network adapter or port, a frequency converter, a baseband processor, a combination thereof, etc. to communicate wireless signals or wired signals via one or more wireless communication links or wired communication links, respectively, such as over at least one channel 108 (e.g., of FIGS. 1 and 2A). Communications with at least one communication interface 410 may enable transmitting, receiving, or initiating of transmissions, just to name a few examples.

For certain example embodiments, at least one interconnect 412 may enable signal communication between or among components of user device 102. Interconnect 412 may comprise, by way of example but not limitation, one or more buses, channels, switching fabrics, some combination thereof, or so forth. Although not explicitly illustrated in FIG. 4, one or more components of user device 102 may be coupled to interconnect 412 via a discrete or integrated interface. By way of example only, one or more interfaces may couple a communication interface 410 or a processor 402 to at least one interconnect 412. For certain example embodiments, at least one power source 414 may provide power to one or more components of user device 102. Power source 414 may comprise, by way of example but not limitation, a battery, a power connector, a solar power source or charger, a mechanical power source or charger, a fuel source, some combination thereof, or so forth.

For certain example embodiments, at least one sensor 418 may sense, produce, or otherwise provide at least one sensor value. Sensors 418 may include, by way of example only, a camera, a microphone, an accelerometer, a thermometer, a satellite positioning system (SPS) sensor, a barometer, a humidity sensor, a compass, a gyroscope, a magnetometer, a pressure sensor, an oscillator, a light sensor, an inertial measurement unit (IMU), a tactile sensor, a touch sensor, a flexibility sensor, a microelectromechanical system (MEMS), some combination thereof, or so forth. Values provided by at least one sensor 418 may comprise, by way of example but not limitation, an image, a sound recording, an acceleration value, a temperature, SPS coordinates, a barometric pressure, a humidity level, a compass direction, a gyroscopic value, a magnetic reading, a pressure value, an oscillation value, an ambient light reading, inertial readings, touch detections, finger placements, flex detections, some combination thereof, or so forth.

For certain example embodiments, a user interface 416 may enable one or more users to interact with user device 102. Interactions between a user and a user device may relate, by way of example but not limitation: to touch/tactile/feeling/haptic sensory (e.g., a user may shake, rotate, decline/incline, bend, twist, or move a user device which may be detected by a gyroscope, an accelerometer, a compass, a combination thereof, etc.; a user may press a button, slide a switch, rotate a knob, etc.; a user may touch a touch-sensitive screen; a device may vibrate; some combination thereof; or so forth), to sound/hearing/speech sensory (e.g., a user may speak into a microphone, a device may generate sounds via a speaker, a combination thereof, etc.), to sights/vision sensory (e.g., a device may activate one or more lights, modify an image presented on a display screen, a combination thereof, etc.), some combination thereof, or so forth.

For certain example embodiments, a user interface 416 may comprise a user input interface 416a, a user output interface 416b, some combination thereof, or so forth. A user input interface 416a may comprise, by way of example but not limitation, a microphone, a button, a switch, a dial, a knob, a wheel, a trackball, a key, a keypad, a keyboard, a touch-sensitive screen, a touch-sensitive surface, a camera, a gyroscope, an accelerometer, a compass, a virtual button/slider/keyboard/etc. presented on a touch-sensitive screen, some combination thereof, or so forth. A user output interface 416b may comprise, by way of example but not limitation, a speaker, a screen (e.g., with or without touch-sensitivity), a vibrating haptic feature, some combination thereof, or so forth. Certain user interfaces 416 may enable both user input and user output. For example, a touch-sensitive screen may be capable of providing user output and accepting user input. Additionally or alternatively, a user interface 416 component (e.g., that may be integrated with or separate from a user device 102), such as a headset that has a microphone and a speaker, may enable both user input and user output.

However, claimed subject matter is not limited to any particular described embodiments, implementations, examples, or so forth. For instance, it should be understood that for certain example implementations components that are illustrated separately in FIG. 4 may not necessarily be separate or mutually exclusive. For example, a given component may provide multiple functionalities. By way of example only, a single component such as a USB connector may function as a wired communication interface 410b or a power source 414. Additionally or alternatively, a single component such as a display screen may function as a communication interface 410 with respect to a user, as a user input interface 416a, or as a user output interface 416b. Additionally or alternatively, one or more instructions 420 may function to realize at least part of a behavioral fingerprint 110 or at least one setting or parameter 422.

It should also be understood that for certain example implementations components that are illustrated in schematic diagram 400 or described herein may or may not be integral with or integrated into a user device 102. For example, a component may be removably connected to a user device 102, a component may be wirelessly coupled to a user device 102, some combination thereof, or so forth. By way of example only, instructions 420 may be stored on a removable card having at least one medium 404. Additionally or alternatively, a user interface 416 (e.g., a wired or wireless headset, a screen, a video camera, a keyboard, a combination thereof, etc.) may be coupled to a user device 102 wirelessly or by wire.

Figure 5:
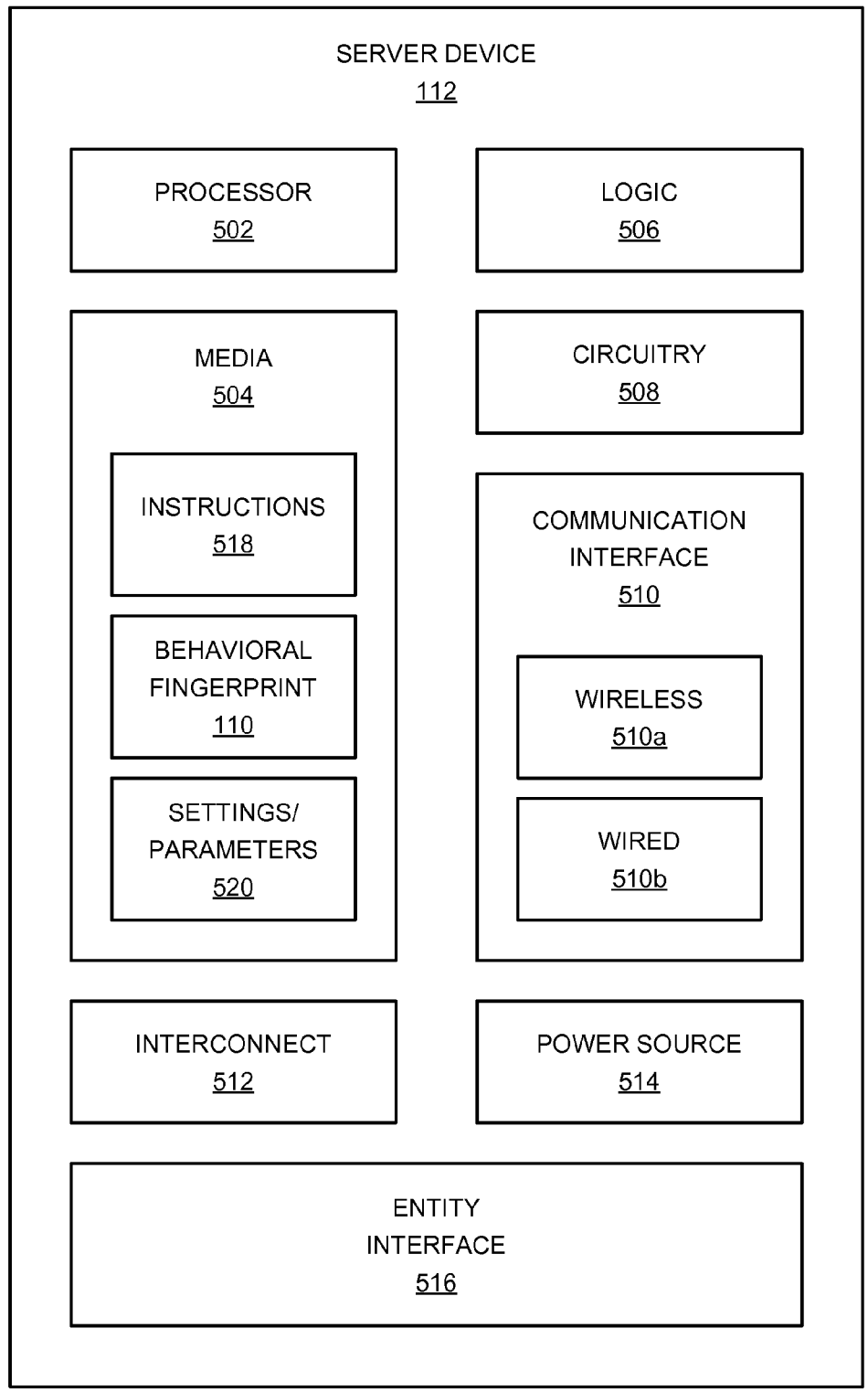
FIG. 5 is a schematic diagram of an example server device including one or more example components in accordance with certain example embodiments.

FIG. 5 is a schematic diagram 500 of an example server device including one or more example components in accordance with certain example embodiments. As shown in FIG. 5, a server device 112 may include one or more components such as: at least one processor 502, one or more media 504, logic 506, circuitry 508, at least one communication interface 510, at least one interconnect 512, at least one power source 514, at least one entity interface 516, some combination thereof, or so forth. Furthermore, as shown in schematic diagram 500, one or more media 504 may comprise one or more instructions 518, at least one behavioral fingerprint 110, one or more settings or parameters 520, some combination thereof, or so forth; or communication interface 510 may comprise at least one wireless communication interface 510a, at least one wired communication interface 510*b*, some combination thereof, or so forth. However, a server device 112 may alternatively include more, fewer, or different components from those that are illustrated without departing from claimed subject matter.

For certain example embodiments, a server device 112 may include or comprise at least one processing or computing device or machine. Server device 112 may comprise, for example, a computing platform or any electronic device or devices having at least one processor or memory. Processor 502 may comprise, by way of example but not limitation, any one or more of a general-purpose processor, a specific-purpose processor, a digital signal processor (DSP), a processing unit, some combination thereof, or so forth. A processing unit may be implemented, for example, with one or more application specific integrated circuits (ASICs), DSPs, digital signal processing devices (DSPDs), programmable logic devices (PLDs), field programmable gate arrays (FPGAs), processors generally, processing cores, discrete/fixed logic circuitry, controllers, micro-controllers, microprocessors, some combination thereof, or so forth. Media 504 may bear, store, contain, include, provide access to, a combination thereof, etc. instructions 518, which may be executable by a processor 502; at least one behavioral fingerprint 110; one or more settings/parameters 520; some combination thereof; or so forth. Instructions 518 may comprise, by way of example but not limitation, a program, a module, an application or app (e.g., that is native, that runs in a browser, that runs within a virtual machine or server, a combination thereof, etc.), an operating system, a combination thereof, etc. or portion thereof; operational data structures; source code, object code, just-in-time (JIT) compiled code, a combination thereof, etc.; processor-executable instructions; other code; some combination thereof; or so forth. Media 504 may comprise, by way of example but not limitation, processor-accessible or non-transitory media (e.g., memory, random access memory (RAM), read only memory (ROM), flash memory, hard drives, disk-based media, disc-based media, magnetic storage, optical storage, volatile memory, nonvolatile memory, a combination thereof, etc.) that is capable of bearing instructions, at least one behavioral fingerprint, settings, parameters, some combination thereof, or so forth.

For certain example embodiments, execution of instructions 518 by one or more processors 502 may transform server device 112 into a special-purpose computing device, apparatus, platform, machine, some combination thereof, or so forth. Instructions 518 may comprise, for example, instructions that are capable of realizing at least a portion of one or more flow diagrams methods, processes, procedures, operations, functionality, technology, mechanisms, a combination thereof, etc. that are described herein or illustrated in the accompanying drawings. Settings/parameters 520 may comprise, by way of example but not limitation, one or more settings or parameters that may be established by a user or other entity, one or more settings or parameters that may be determined by a server device 112, one or more settings or parameters that may be determined by a user or other entity, one or more settings or parameters that may be detected by a server device 112, one or more settings or parameters that may be received from another device that detected them, one or more settings or parameters that may determine at least partly how a server device 112 is to operate or respond to a situation or a behavioral fingerprint, one or more settings or parameters (e.g., values) that may be used to realize flow diagrams, methods, processes, procedures, operations, functionality, technology, mechanisms, a combination thereof, etc. that are described herein or illustrated in the accompanying drawings. Settings/parameters 520 may control at least partially how at least one behavioral fingerprint 110 is configured, stored, shared, used, applied, some combination thereof, or so forth. Additionally or alternatively, at least a portion of settings/parameters 520 may be at least partially integrated with at least one behavioral fingerprint 110.

For certain example embodiments, logic 506 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings. Circuitry 508 may comprise hardware, software, firmware, discrete/fixed logic circuitry, a combination thereof, etc. that is capable of performing or facilitating performance of flow diagrams, methods, processes, procedures, operations, functionality, technology, mechanisms, a combination thereof, etc. that are described herein or illustrated in the accompanying drawings, wherein circuitry 508 comprises at least one physical or hardware component or aspect.

For certain example embodiments, one or more communication interfaces 510 may provide one or more interfaces between server device 112 and another device or a person/operator/entity directly or indirectly. A wireless communication interface 510*a* or a wired communication interface 510*b* may also or alternatively include, by way of example but not limitation, a transceiver (e.g., a transmitter or a receiver), a radio, an antenna, a wired interface connector or other similar apparatus (e.g., a network connector, a universal serial bus (USB) connector, a proprietary connector, a Thunderbolt® or Light Peak® connector, a gateway, a combination thereof, etc.), a physical or logical network adapter or port, a frequency converter, a baseband processor, an internet or telecommunications backbone connector, a fiber optic connector, a storage area network (SAN) connector, a combination thereof, etc. to communicate wireless signals or wired signals via one or more wireless communication links or wired communication links, respectively, such as over one or more channels 108 (e.g., of FIGS. 1 and 2A). Communications with at least one communication interface 510 may enable transmitting, receiving, or initiating of transmissions, just to name a few examples.

For certain example embodiments, at least one interconnect 512 may enable signal communication between or among components of server device 112. Interconnect 512 may comprise, by way of example but not limitation, one or more buses, channels, switching fabrics, local area networks (LANs), storage area networks (SANs), some combination thereof, or so forth. Although not explicitly illustrated in FIG. 5, one or more components of server device 112 may be coupled to interconnect 512 via a discrete or integrated interface. By way of example only, one or more interfaces may couple a processor 502 or a medium 504 to at least one interconnect 512. For certain example embodiments, at least one power source 514 may provide power to one or more components of server device 112. Power source 514 may comprise, by way of example but not limitation, a power connector for accessing an electrical grid, a fuel cell, a solar power source, some combination thereof, or so forth.

For certain example embodiments, an entity interface 516 may enable one or more entities (e.g., another device, a person, a group, a combination thereof, etc.) to provide input to or receive output from server device 112. Interactions between an entity and a device may relate, by way of example but not limitation, to inputting or outputting instructions, commands, settings, parameters, indications, some combination thereof, or so forth. Certain entity interfaces 516 may enable both entity input and entity output at server device 112 or over at least one network link, such as one or more channels 108 (e.g., of FIGS. 1 and 2A).

However, claimed subject matter is not limited to any particular described embodiments, implementations, examples, or so forth. For instance, it should be understood that for certain example implementations components that are illustrated separately in FIG. 5 need not necessarily be separate or mutually exclusive. For example, a given component may provide multiple functionalities. By way of example only, hard-wired logic 506 may form circuitry 508. Additionally or alternatively, a single component such as a connector may function as a communication interface 510 or as an entity interface 516. Additionally or alternatively, one or more instructions 518 may function to realize at least one setting or parameter 520.

It should also be understood that for certain example implementations components that are illustrated in schematic diagram 500 or described herein may not be integral or integrated with a server device 112. For example, a component may be removably connected to a server device 112, a component may be wirelessly coupled to a server device 112, one or more components of a server device 112 may be geographically distributed or separated from one another, some combination thereof, or so forth. By way of example only, instructions 518 may be stored on one medium 504, and settings/parameters 520 (or another portion of instructions 518) may be stored on a different medium 504, which may comprise a same server or a part of a different server of, e.g., a server farm. Additionally or alternatively, respective processor-media sets may be physically realized on different or respective server blades or server containers. Multiple server blades, for instance, may be linked or interlinked to realize at least one server device 112.

Figure 6A:
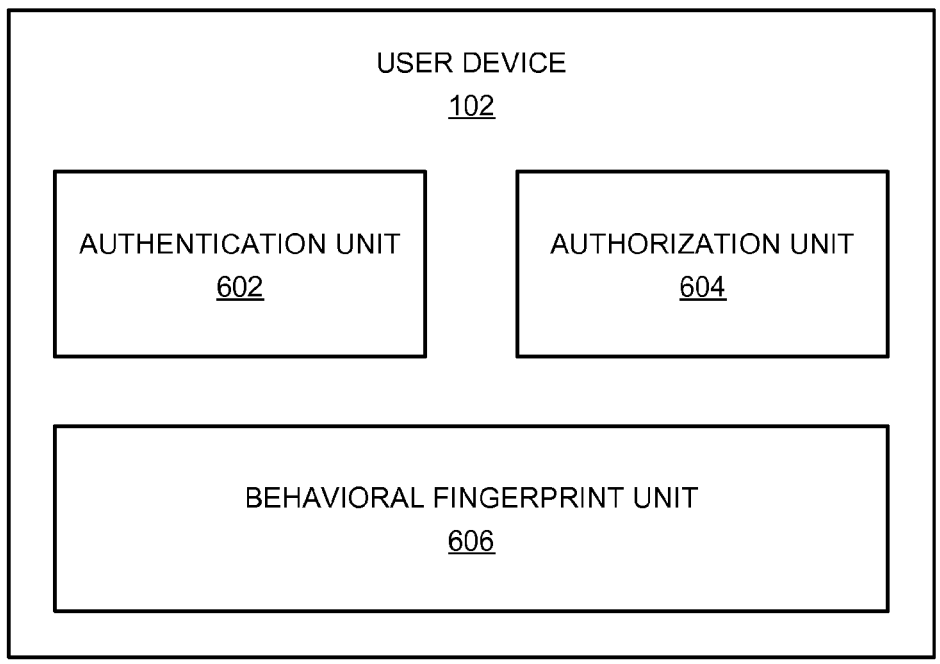
FIGS. 6A and 6B are schematic diagrams of an example user device and an example server device, respectively, that have one or more functional units in accordance with certain example embodiments.
Figure 6B:
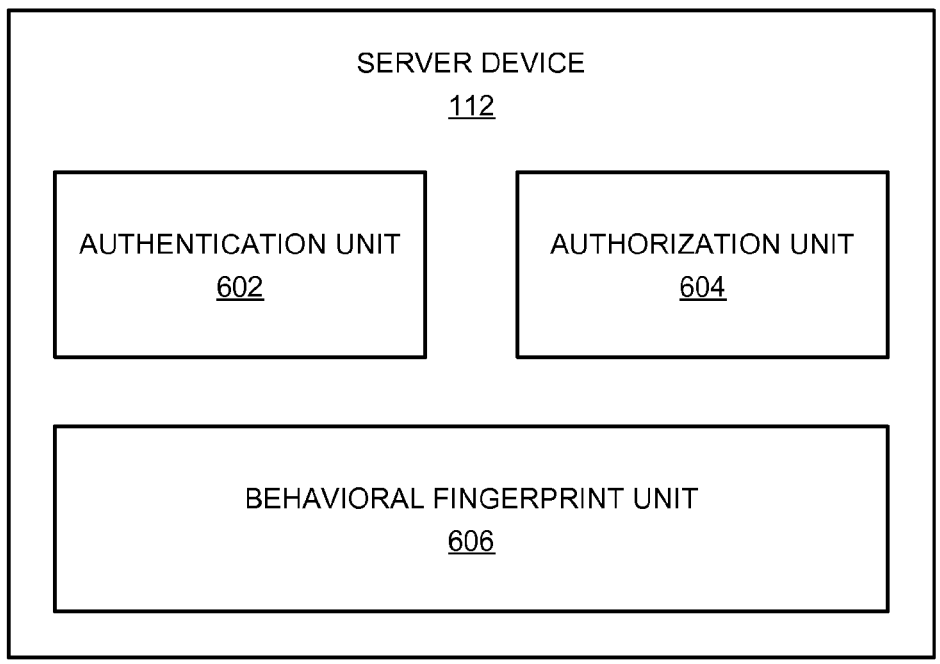

FIGS. 6A and 6B are schematic diagrams 600A and 600B of an example user device and an example server device, respectively, that have one or more functional units in accordance with certain example embodiments. As shown in FIGS. 6A and 6B, by way of example but not limitation, schematic diagrams 600A and 600B may comprise a user device 102 and a server device 112, respectively. As illustrated in schematic diagrams 600A and 600B, a user device 102 or a server device 112 may include, but are not limited to, at least one authentication unit 602, at least one authorization unit 604, at least one behavioral fingerprint unit 606, a combination thereof, or so forth. However, a user device 102 or a server device 112 may alternatively include more, fewer, or different unit(s) from those that are illustrated without departing from claimed subject matter.

For certain example embodiments, a unit may be comprised of at least one processor (e.g., a processor 402 of FIG. 4, a processor 502 of FIG. 5, a combination thereof, etc.), one or more media (e.g., a medium 404 of FIG. 4, media medium 504 of FIG. 5, a combination thereof, etc.), instructions (e.g., processor-executable instructions, instructions 420 of FIG. 4, instructions 518 of FIG. 5, computer-implementable instructions, a combination thereof, etc.), logic (e.g., logic 406 of FIG. 4, logic 506 of FIG. 5, a combination thereof, etc.), circuitry (e.g., circuitry 408 of FIG. 4, circuitry 508 of FIG. 5, a combination thereof, etc.), other described or illustrated component(s), some combination thereof, or so forth. For certain example implementations, one or more units (e.g., an authentication unit 602, an authorization unit 604, a behavioral fingerprint unit 606, a combination thereof, etc.) of at least one user device 102 may function or interoperate with one or more units of at least one server device 112. However, claimed subject matter is not limited to any particular described embodiments, implementations, examples, etc.

For certain example embodiments, an authentication unit 602 may operate to authenticate a user of a device. For certain example implementations, a user of a device may be authenticated by determining to some (e.g., reasonable, acceptable, measurable, quantifiable, a combination thereof, etc.) degree an identity of a user. By way of example but not limitation, an authentication unit 602 may enable implementation of multiple degrees of authentication, with different degrees of authentication corresponding to different levels of certainty of an identity of a user. Example aspects related to authentication are described further herein (e.g., at least herein above with particular reference to FIG. 1).

For certain example embodiments, an authorization unit 604 may operate to permit or enable full or at least partial access to, use of, implementation of, execution of, a combination thereof, etc. one or more features, applications, accounts, profiles, data, capabilities, a combination thereof, etc. of at least one device, such as a user device 102 or a server device 112. For certain example implementations, authorization may be fully or at least partially granted, denied, withheld, a combination thereof, etc. based at least partially on an authentication determination, a result from an authentication unit 602, some combination thereof, or so forth. By way of example but not limitation, an authorization unit 604 may provide for different levels of authorization, including but not limited to for a given authorized user, that correspond to different degrees of authentication, that correspond to different user identities, some combination thereof, or so forth. Example aspects related to authorization are described further herein (e.g., at least herein above with particular reference to FIG. 1).

For certain example embodiments, a behavioral fingerprint unit 606 may operate to implement, perform, facilitating performance of, a combination thereof, etc. one or more flow diagrams, methods, processes, procedures, operations, functionality, technology, mechanisms, a combination thereof, etc. that are described herein or illustrated in the accompanying drawings or that relate to at least one behavioral fingerprint. For certain example implementations, a behavioral fingerprint unit 606 may provide information, monitored acts, likelihood values, determinations, comparisons, analyses, indications, predicted acts, a combination thereof, etc. to an authentication unit 602 on which it may at least partially base an authentication determination. Example aspects related to behavioral fingerprinting are described further herein above and below.

Figure 7A:
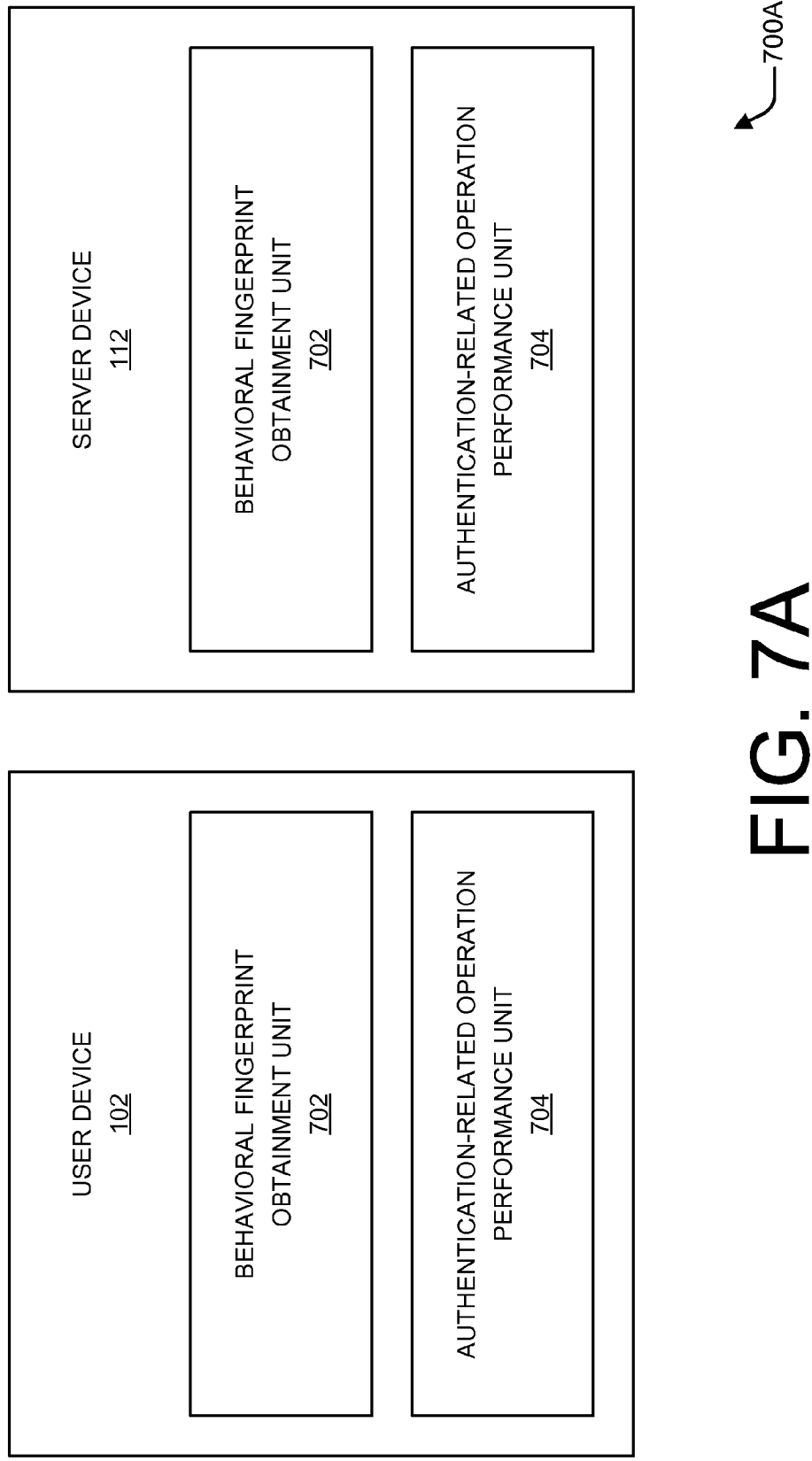
FIG. 7A is a schematic diagram that includes at least one example device that is capable of handling scenarios for multi-device behavioral fingerprinting in accordance with certain example embodiments.

FIG. 7A is a schematic diagram 700A that includes at least one example device that is capable of handling scenarios for multi-device behavioral fingerprinting in accordance with certain example embodiments. As shown in FIG. 7A, by way of example but not limitation, schematic diagram 700A includes at least one device that may comprise a behavioral fingerprint obtainment unit 702 or an authentication-related operation performance unit 704. More specifically, schematic diagram 700A may include a user device 102 or a server device 112. By way of example but not limitation, a behavioral fingerprint obtainment unit 702 or an authentication-related operation performance unit 704 may comprise one or more modules, hardware, software, firmware, logic, circuitry, some combination thereof, or so forth. However, claimed subject matter is not limited to any particular described embodiments, implementations, examples, etc.

For certain example embodiments, a behavioral fingerprint obtainment unit 702 or an authentication-related operation performance unit 704 may be implemented separately or at least partially jointly or in combination. A behavioral fingerprint obtainment unit 702 may be configured to obtain at least one behavioral fingerprint that is associated with at least one authorized user, the at least one behavioral fingerprint including one or more indicators of utilization of two or more user devices by the at least one authorized user. An authentication-related operation performance unit 704 may be configured to perform at least one authentication-related operation based at least partially on the at least one behavioral fingerprint. However, claimed subject matter is not limited to any particular described embodiments, implementations, examples, etc.

Figure 7B:
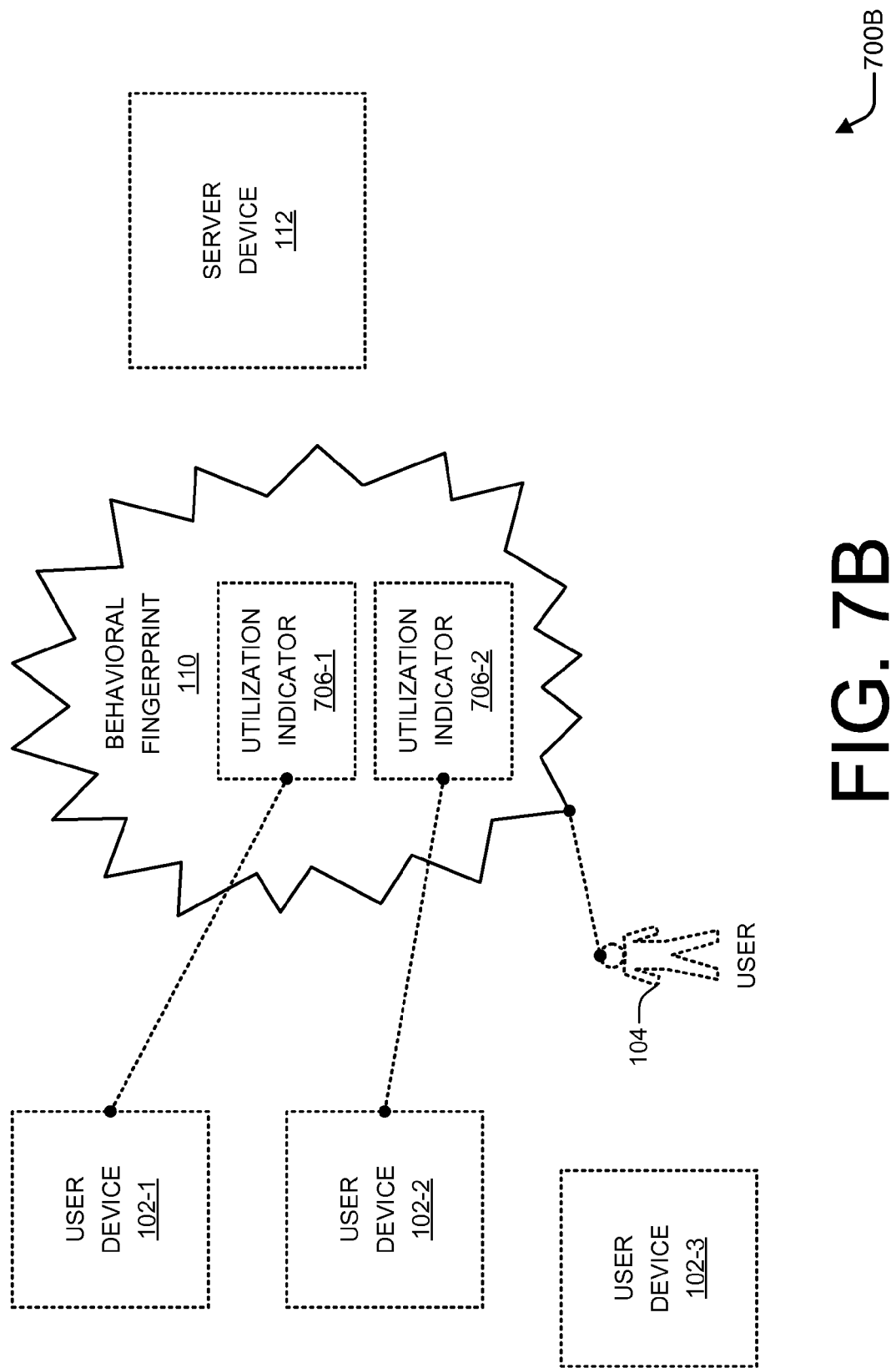
FIGS. 7B-7C are schematic diagrams that include at least two example devices and that depict example scenarios for implementing multi-device behavioral fingerprinting in accordance with certain example embodiments.
Figure 7C:
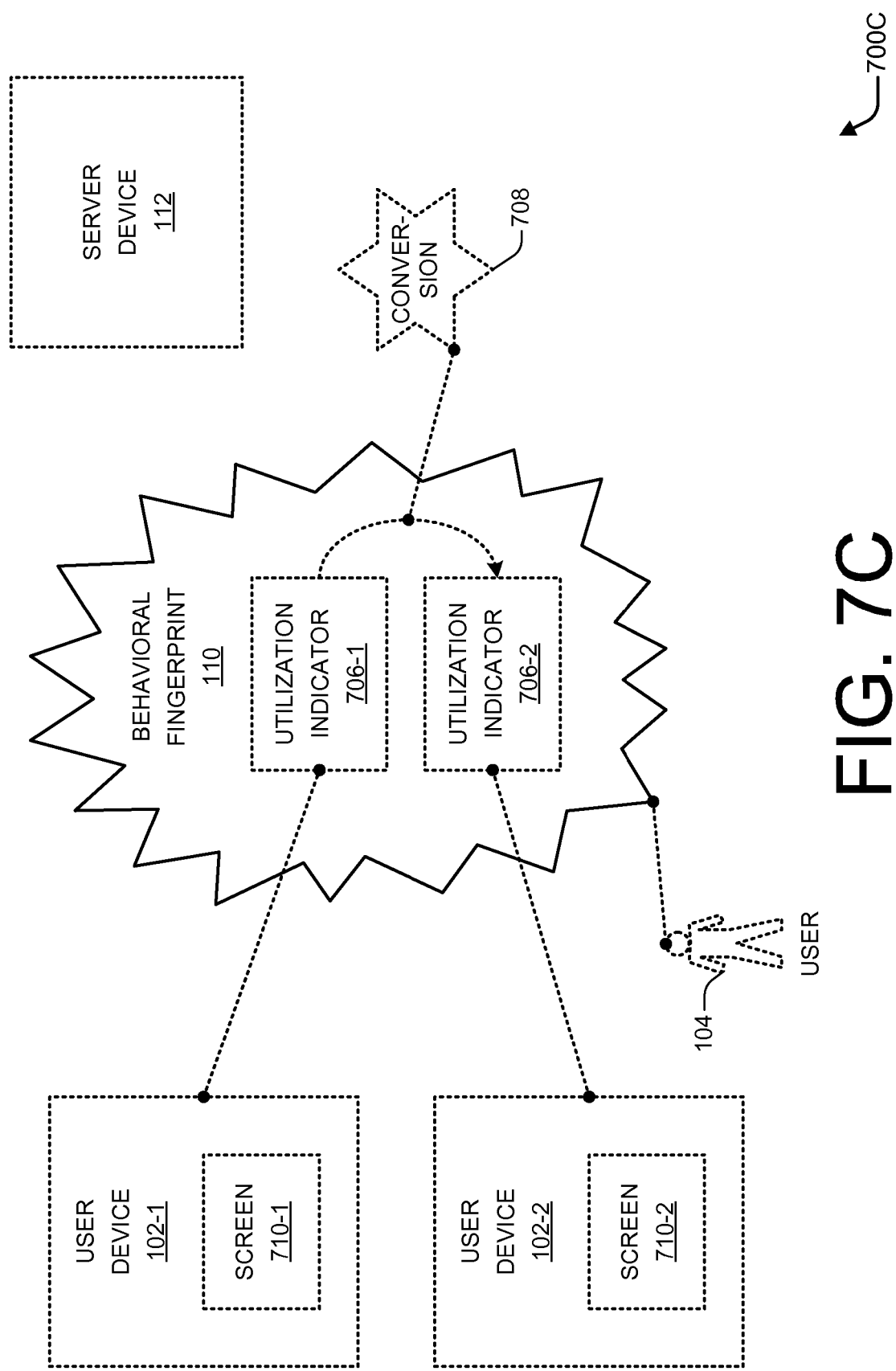

FIGS. 7B-7C are schematic diagrams 700B-700C that include at least two example devices and that depict example scenarios for implementing multi-device behavioral fingerprinting in accordance with certain example embodiments. As shown in FIGS. 7B-7C, by way of example but not limitation, one or more of schematic diagrams 700B-700C may include at least one user device 102, at least one user 104, at least one behavioral fingerprint 110, at least one server device 112, at least one utilization indicator 706, at least one conversion 708, or at least one screen 710. Each of schematic diagrams 700B-700C may include alternative or additional depictions, which may relate to multi-device behavioral fingerprinting, as described herein below. In addition to or in alternative to description herein below with specific reference to FIGS. 7B-7C, illustrated aspects of schematic diagrams 700B-700C may be relevant to example description with reference to FIGS. 8A-8J. However, claimed subject matter is not limited to any particular described embodiments, implementations, examples, etc.

As shown in FIG. 7B, by way of example but not limitation, schematic diagram 700B may include at least one user device 102, at least one user 104, at least one behavioral fingerprint 110, at least one server device 112, or at least one utilization indicator 706. More specifically, schematic diagram 700B may include a first user device 102-1, a second user device 102-2, a third user device 102-3, a user 104 that may comprise an authorized user, an indicator of utilization 706-1 of a first user device, or an indicator of utilization 706-2 of a second user device. For certain example embodiments, at least one utilization indicator 706-1 may correspond to (e.g., be monitored, detected, observed, a combination thereof, etc. at or by) a first user device 102-1, or at least one utilization indicator 706-2 may correspond to a second user device 102-2. An indicator of utilization 706 (or utilization indicator 706) may comprise, by way of example but not limitation, at least one indicator of any of indicators 302-322 (e.g., of FIG. 3). For certain example implementations, a third user device 102-3 may correspond to at least one utilization indicator 706 (not explicitly shown) of at least one behavioral fingerprint 110, may not correspond to any utilization indicator, may correspond to a utilization indicator of a different behavioral fingerprint (not explicitly shown), some combination thereof, or so forth. By way of example but not limitation, a third user device 102-3, another user device 102, a server device 112, a combination thereof, etc. may use a behavioral fingerprint 110 in conjunction with an authentication-related operation for third user device 102-3 if there is or if there is not a utilization indicator 706 of behavioral fingerprint 110 that corresponds to third user device 102-3. Additional or alternative description that may be relevant to schematic diagram 700B is provided herein below with particular reference to one or more of any of FIGS. 8A-8J.

As shown in FIG. 7C, by way of example but not limitation, schematic diagram 700C may include at least one user device 102, at least one user 104, at least one behavioral fingerprint 110, at least one server device 112, at least one utilization indicator 706, at least one conversion 708, or at least one screen 710. More specifically, schematic diagram 700C may include a first user device 102-1, a second user device 102-2, a user 104 that may comprise an authorized user, a first indicator of utilization 706-1 of a first user device (e.g., a first user device 102-1), a second indicator of utilization 706-2 of a second user device (e.g., a second user device 102-2), a first screen 710-1, or a second screen 710-2. For certain example embodiments, a conversion 708 may be performed (e.g., via a utilization indicator converter unit (not explicitly shown)) at any one or more of a first user device 102-1, a second user device 102-2, another user device 102, a server device 112, some combination thereof, or so forth. For certain example embodiments, a conversion 708 may convert (e.g., alter, modify, change from one form to another, change from one format to another, change from being more appropriate for one device to being more appropriate for another device, change from being applicable for one device type to being applicable for another device type, change in size, change in content, change in organization, a combination thereof, etc.) a first utilization indicator 706-1 that corresponds to a first user device 102-1 to a second utilization indicator 706-2 that corresponds to a second user device 102-2. For certain example implementations, a second utilization indicator 706-2 that corresponds to a second user device 102-2, which results from a conversion 708 from a first utilization indicator 706-1 that corresponds to a first user device 102-1, may be used (e.g., as part of a behavioral fingerprint 110) at least partially for an authentication-related operation pertaining to second user device 102-2 that is being used by a user 104. Additional or alternative description that may be relevant to schematic diagram 700C is provided herein below with particular reference to one or more of any of FIGS. 8A-8J.

Figure 8A:
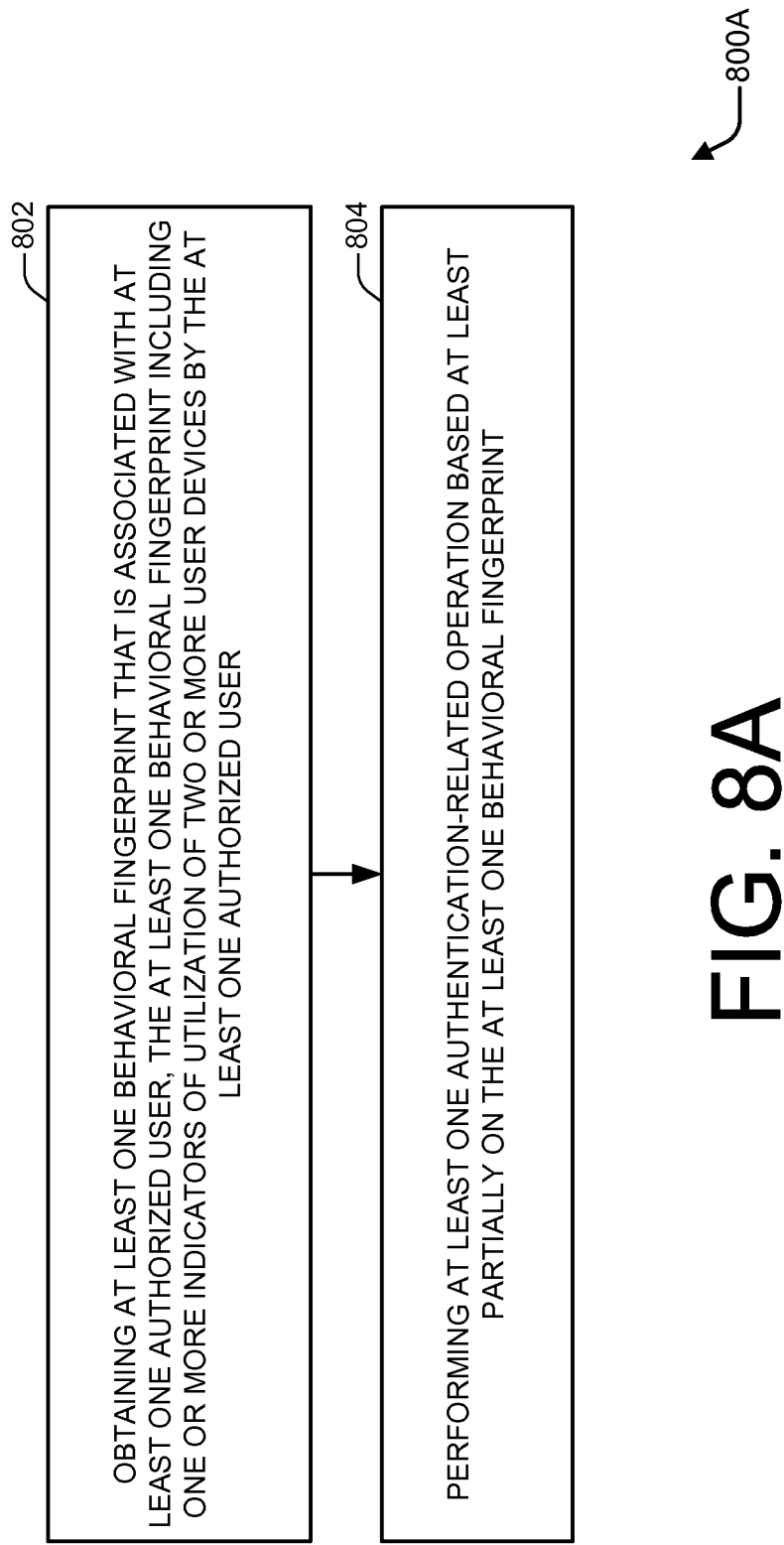
FIG. 8A is a flow diagram illustrating an example method for at least one device with regard to multi-device behavioral fingerprinting in accordance with certain example embodiments.

FIG. 8A is a flow diagram 800A illustrating an example method for at least one device with regard to multi-device behavioral fingerprinting in accordance with certain example embodiments. As illustrated, flow diagram 800A may include any of operations 802-804. Although operations 802-804 are shown or described in a particular order, it should be understood that methods may be performed in alternative manners without departing from claimed subject matter, including, but not limited to, with a different order or number of operations or with a different relationship between or among operations. Also, at least some operation(s) of flow diagram 800A may be performed so as to be fully or partially overlapping with other operation(s). For certain example embodiments, one or more operations of flow diagram 800A may be performed by at least one user device (e.g., a user device 102) or at least one server device (e.g., a server device 112).

For certain example embodiments, a method for multiple-device behavioral fingerprinting, which method may be at least partially implemented using hardware, such as that of at least one of a user device or a server device, may comprise an operation 802 or an operation 804. An operation 802 may be directed at least partially to obtaining at least one behavioral fingerprint that is associated with at least one authorized user, the at least one behavioral fingerprint including one or more indicators of utilization of two or more user devices by the at least one authorized user. For certain example implementations, at least one device 102 or 112 (e.g., a user device 102, a server device 112, a combination thereof, etc.) may obtain (e.g., acquire, ascertain, receive, retrieve, accept, load, extract, a combination thereof, etc. from the at least one device itself, from at least one memory, from another device, from a program or data structure, from another location, a combination thereof, etc.) at least one behavioral fingerprint 110 (e.g., one or more indicators representing one or more behaviors of at least one user with respect to at least one user device, one or more indicators representing one or more habits of at least one user with respect to at least one user device, one or more indicators representing usage of at least one user device by at least one user, one or more indicators representing one or more actions of at least one user with respect to at least one user device, one or more indicators representing one or more predicted acts of at least one user with respect to at least one device, at least one status of a user that is utilizing or that corresponds to a user device, at least one indicator of one or more indicators 302-322 which may comprise a behavioral fingerprint 110, a combination thereof, etc.) that is associated with at least one authorized user (e.g., a user 104 that is authorized to use a given user device 102 to at least some extent), the at least one behavioral fingerprint including one or more indicators 302-322 (e.g., one or more of any of indicators 302-322 of FIG. 3 as described herein above, including but not limited to predicted acts 322) of utilization (e.g., accessing, using, interacting with, carrying, providing input to, receiving output from, communicating with, running apps on, requesting or completing or effecting transactions via, directing operation of, a combination thereof, etc.) of two or more user devices 102 by the at least one authorized user. By way of example but not limitation, a behavioral fingerprint 110 that is associated with at least one user 104, who comprises an authorized user, and that includes one or more indicators of utilization 706 of at least two user devices 102-1 and 102-2 by the authorized user may be obtained by a behavioral fingerprint obtainment unit 702 of at least one of a first user device 102-1, a second user device 102-2, a third user device 102-3, a server device 112, some combination thereof, or so forth. However, claimed subject matter is not limited to any particular described embodiments, implementations, examples, etc.

For certain example embodiments, an operation 804 may be directed at least partially to performing at least one authentication-related operation based at least partially on the at least one behavioral fingerprint. For certain example implementations, at least one device 102 or 112 (e.g., a user device 102, a server device 112, a combination thereof, etc.) may perform (e.g., implement, execute, initiate, complete, prompt, cause to be effectuated, conduct, a combination thereof, etc.) at least one authentication-related operation (e.g., a user identification, a user identification to some degree of certainty, a transaction approval, a transaction rejection, a transaction-related recommendation, an access determination to a device feature or capability, an authorization decision based at least partly on a user identity, an access determination to data or media, a determination of if or whether a user may utilize a device in a manner that incurs fees or charges, a determination of which or what communication modes or apps may be used or to what extent it/they may be used, a combination thereof, etc.) based at least partially on (e.g., at least partly using, responsive to, with consideration of, affected by, impacted by, a combination thereof, etc.) the at least one behavioral fingerprint 110. By way of example but not limitation, at least one operation that relates to (e.g., that involves, that includes, that relies on, that prompts an incidence of, that permissively follows, a combination thereof, etc.) authentication may be performed by an authentication-related operation performance unit 704 of at least one of a first user device 102-1, a second user device 102-2, a third user device 102-3, a server device 112, a combination thereof, etc. based at least partly on at least one behavioral fingerprint 110. However, claimed subject matter is not limited to any particular described embodiments, implementations, examples, etc.

FIGS. 8B-8J depict example additions or alternatives for a flow diagram of FIG. 8A in accordance with certain example embodiments. As illustrated, flow diagrams of FIGS. 8B-8J may include any of the illustrated or described operations. Although operations are shown or described in a particular order or with a particular relationship to one or more other operations, it should be understood that methods may be performed in alternative manners without departing from claimed subject matter, including, but not limited to, with a different order or number of operations or with a different relationship between or among operations (e.g., operations that are illustrated as nested blocks are not necessarily subsidiary operations and may instead be performed independently). Also, at least some operation(s) of flow diagrams of FIGS. 8B-8J may be performed so as to be fully or partially overlapping with other operation(s).

Figure 8B:
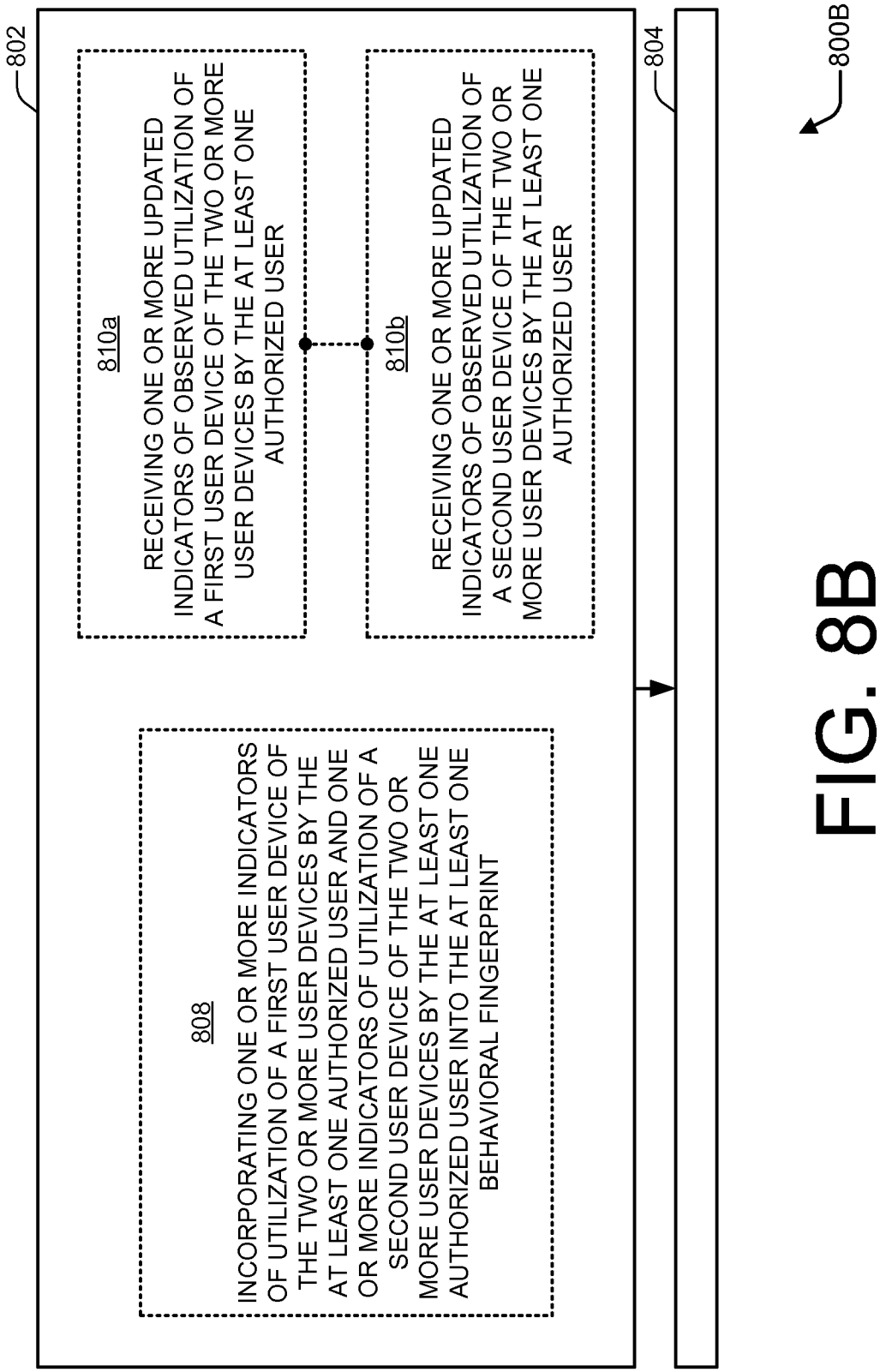

FIG. 8B illustrates a flow diagram 800B having example operations 808, 810a, or 810b. For certain example embodiments, an operation 808 may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises incorporating one or more indicators of utilization of a first user device of the two or more user devices by the at least one authorized user and one or more indicators of utilization of a second user device of the two or more user devices by the at least one authorized user into the at least one behavioral fingerprint. For certain example implementations, at least one device 102 or 112 (e.g., a user device 102, a server device 112, a combination thereof, etc.) may incorporate (e.g., add, supplement with, update using, augment with, replace with, modify using, adapt using, change statistics using, create at least one new predicted act, alter at least one existing predicted act, amalgamate, a combination thereof, etc.) one or more indicators of utilization 706-1 of a first user device 102-1 of two or more user devices 102 by at least one authorized user (e.g. a user 104 that has been authenticated or authorized at, by, for, a combination thereof, etc. a given user device 102) and one or more indicators of utilization 706-2 of a second user device 102-2 of the two or more user devices by the at least one authorized user into the at least one behavioral fingerprint 110. However, claimed subject matter is not limited to any particular described embodiments, implementations, examples, etc.

For certain example embodiments, an operation 810a and an operation 810b may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises receiving one or more updated indicators of observed utilization of a first user device of the two or more user devices by the at least one authorized user (for operation 810a) and receiving one or more updated indicators of observed utilization of a second user device of the two or more user devices by the at least one authorized user (for operation 810b). For certain example implementations, at least one device 102 or 112 (e.g., a user device 102, a server device 112, a combination thereof, etc.) may receive (e.g., in at least one transmission, from a user device, from a server device, from storage media, via at least one wireless channel, via at least one wired channel, via at least one network, a combination thereof, etc.) one or more updated (e.g., changed, new, current, different, most-recently acquired, acquired since a previous receiving of an indicator, a combination thereof, etc.) indicators 706-1 of observed (e.g., monitored of an authorized user) utilization of a first user device 102-1 of two or more user devices 102 by at least one authorized user; or receive one or more updated indicators 706-2 of observed utilization of a second user device 102-2 of the two or more user devices by the at least one authorized user. However, claimed subject matter is not limited to any particular described embodiments, implementations, examples, etc.

Figure 8C:
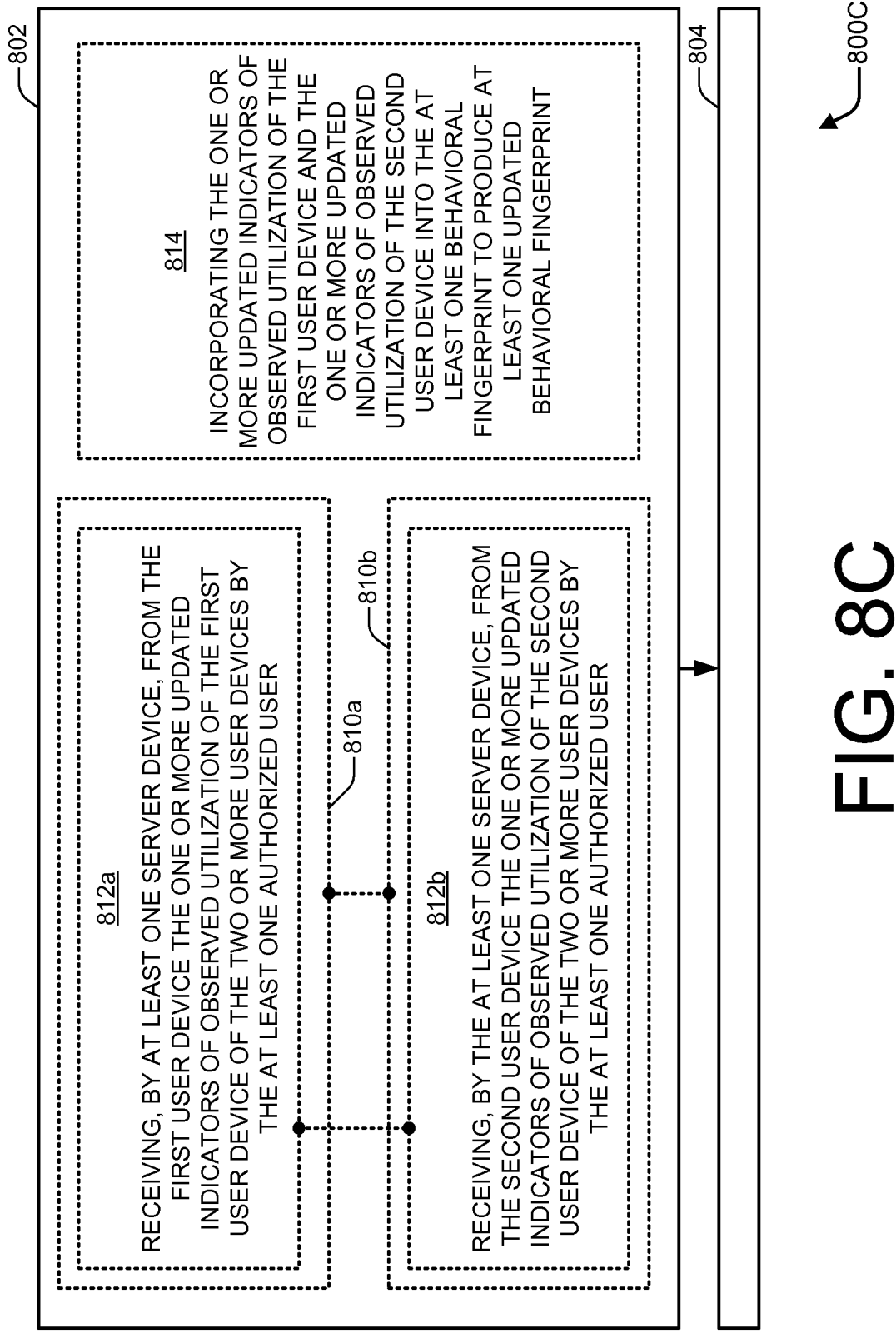

FIG. 8C illustrates a flow diagram 800C having example operations 812a, 812b, or 814. For certain example embodiments, an operation 812a and an operation 812b may be respectively directed at least partially to wherein the receiving one or more updated indicators of observed utilization of a first user device of the two or more user devices by the at least one authorized user (of operation 810a) comprises receiving, by at least one server device, from the first user device the one or more updated indicators of observed utilization of the first user device of the two or more user devices by the at least one authorized user (for operation 812a) and to wherein the receiving one or more updated indicators of observed utilization of a second user device of the two or more user devices by the at least one authorized user (of operation 810b) comprises receiving, by the at least one server device, from the second user device the one or more updated indicators of observed utilization of the second user device of the two or more user devices by the at least one authorized user (for operation 812b). For certain example implementations, a server device 112 may receive from a first user device 102-1 one or more updated indicators 106-1 of observed utilization of the first user device of two or more user devices by at least one authorized user or may receive from a second user device 102-2 one or more updated indicators 106-2 of observed utilization of the second user device of the two or more user devices by the at least one authorized user. However, claimed subject matter is not limited to any particular described embodiments, implementations, examples, etc.

For certain example embodiments, an operation 814 may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises incorporating the one or more updated indicators of observed utilization of the first user device and the one or more updated indicators of observed utilization of the second user device into the at least one behavioral fingerprint to produce at least one updated behavioral fingerprint. For certain example implementations, at least one device (e.g., a server device 112) may incorporate one or more updated indicators 706-1 of observed utilization of a first user device 102-1 and one or more updated indicators 706-2 of observed utilization of a second user device 102-2 into at least one behavioral fingerprint to produce at least one updated behavioral fingerprint (e.g., at least one behavioral fingerprint 110 that is at least partially changed, modified, altered, newer, current, different, changed based on most-recently acquired monitoring, changed since receiving a previous updated indicator, a combination thereof, etc.). However, claimed subject matter is not limited to any particular described embodiments, implementations, examples, etc.

Figure 8D:
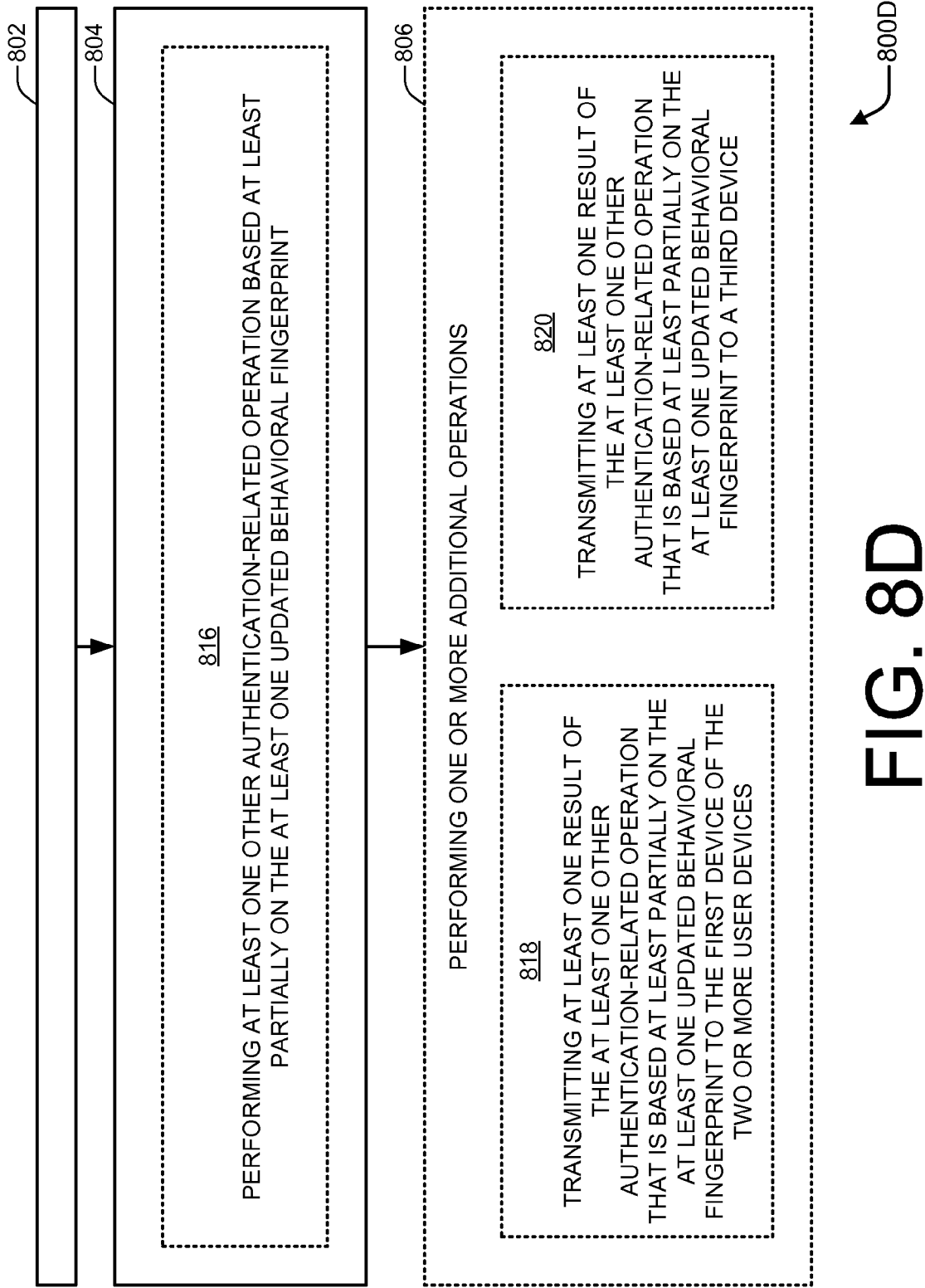

FIG. 8D illustrates a flow diagram 800D having example operations 816, 818, or 820. For certain example embodiments, an operation 816 may be directed at least partially to wherein the performing at least one authentication-related operation based at least partially on the at least one behavioral fingerprint (of operation 804) comprises performing at least one other authentication-related operation based at least partially on the at least one updated behavioral fingerprint. For certain example implementations, at least one device (e.g., a server device 112) may perform at least one other authentication-related operation (e.g., a user identification, a user identification to some degree of certainty, a transaction approval, a transaction rejection, a transaction-related recommendation, an access determination to a device feature or capability, an authorization decision based at least partly on a user identity, an access determination to data or media, a determination of if or whether a user may utilize a device in a manner that incurs fees or charges, a determination of which or what communication modes or apps may be used or to what extent it/they may be used, a combination thereof, etc.) based at least partially on the at least one updated behavioral fingerprint. However, claimed subject matter is not limited to any particular described embodiments, implementations, examples, etc.

As shown explicitly in flow diagram 800D of FIG. 8D, a flow diagram may include an operation 806 for performing one or more additional operations. For certain example embodiments, a method may include a further operation 818 that is directed at least partially to transmitting at least one result of the at least one other authentication-related operation that is based at least partially on the at least one updated behavioral fingerprint to the first device of the two or more user devices. For certain example implementations, at least one device (e.g., a server device 112) may transmit (e.g., via at least one wireless channel, via at least one wired channel, via at least one network, a combination thereof, etc.) at least one result (e.g., an approval, a denial, an authorization, a code that enables access, a person-perceptible instruction, an identification of a user, a combination thereof, etc.) of at least one other authentication-related operation that is based at least partially on at least one updated behavioral fingerprint to a first device 102-1 of two or more user devices 102-1 and 102-2. However, claimed subject matter is not limited to any particular described embodiments, implementations, examples, etc.

For certain example embodiments, a method may include a further operation 820 that is directed at least partially to transmitting at least one result of the at least one other authentication-related operation that is based at least partially on the at least one updated behavioral fingerprint to a third device. For certain example implementations, at least one device (e.g., a server device 112) may transmit at least one result of at least one other authentication-related operation that is based at least partially on at least one updated behavioral fingerprint to a third device (e.g., to a user device 102-3 that is not necessarily contributing indications derived from observed utilization to at least one behavioral fingerprint 110, to another server device, a combination thereof, etc.). However, claimed subject matter is not limited to any particular described embodiments, implementations, examples, etc.

Although operations 812-820 may be described herein at least partially in terms of being performable by at least one server device 112, claimed subject matter is not so limited. For example, any one or more of such operations 812-820 may be performable by at least one user device 102 (or a combination of at least one user device 102 and at least one server device 112).

Figure 8E:
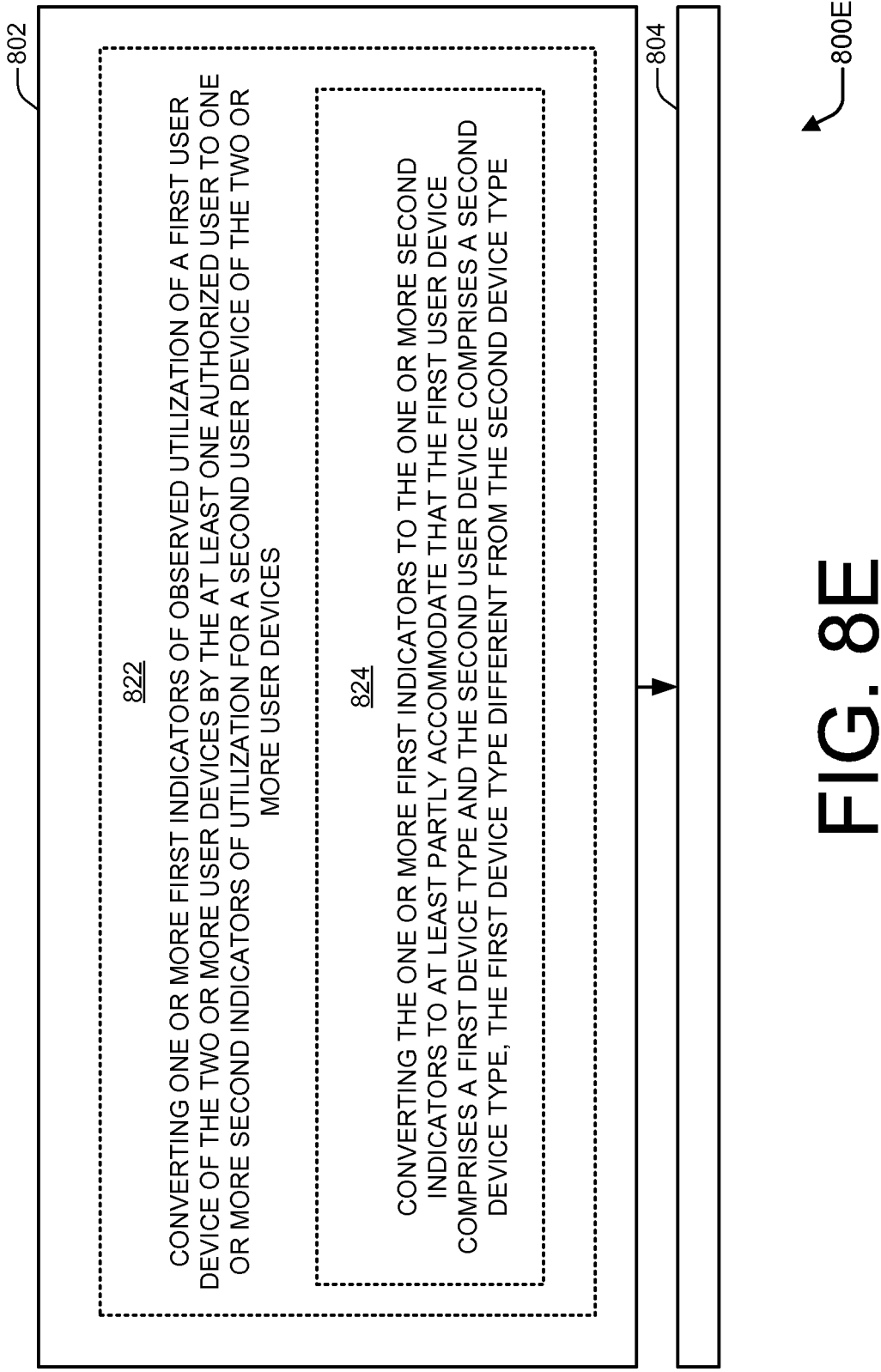

FIG. 8E illustrates a flow diagram 800E having example operations 822 or 824. For certain example embodiments, an operation 822 may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises converting one or more first indicators of observed utilization of a first user device of the two or more user devices by the at least one authorized user to one or more second indicators of utilization for a second user device of the two or more user devices. For certain example implementations, at least one device 102 or 112 (e.g., a user device 102, a server device 112, a combination thereof, etc.) may convert (e.g., alter, modify, change from one form to another, change from one format to another, change from being more appropriate for one device to being more appropriate for another device, change from being applicable for one device type to being applicable for another device type, change in size, change in content, change in organization, a combination thereof, etc.) one or more first indicators 706-1 of observed utilization of a first user device 102-1 of two or more user devices 102 by at least one authorized user (e.g., a user 104 that is authorized to use a given user device 102 to at least some extent) to one or more second indicators 706-2 of utilization for a second user device 102-2 of the two or more user devices. However, claimed subject matter is not limited to any particular described embodiments, implementations, examples, etc.

For certain example embodiments, an operation 824 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators to the one or more second indicators to at least partly compensate for the first user device comprising a first user device type and the second user device comprising a second user device type, the first user device type different from the second user device type. For certain example implementations, at least one device 102 or 112 (e.g., a user device 102, a server device 112, a combination thereof, etc.) may convert 708 one or more first indicators 706-1 to one or more second indicators 706-2 to at least partly compensate for (e.g., account for, reflect, adjust or accommodate to handle, a combination thereof, etc. at least one difference between or among) a first user device 102-1 comprising a first user device type (e.g., a mobile or smart phone; a tablet, slate, or pad computer; a laptop, notebook, or netbook computer; a desktop computer with a CPU tower, a CPU desk unit, or an integrated "all-in-one" screen and CPU; a vehicle-installed computing device for navigation, for entertainment, for vehicle control or monitoring, or for communication; a computing device installed in a home appliance such as a refrigerator; a set-top box or television-oriented computing device; a hand-held entertainment device such as a portable gaming device or music player; an electronic reader; etc.) and a second user device 102-2 comprising a second user device type (e.g., a mobile or smart phone; a tablet, slate, or pad computer; a laptop, notebook, or netbook computer; a desktop computer with a CPU tower, a CPU desk unit, or an integrated "all-in-one" screen and CPU; a vehicle-installed computing device for navigation, for entertainment, for vehicle control or monitoring, or for communication; a computing device installed in a home appliance such as a refrigerator; a set-top box or television-oriented computing device; a hand-held entertainment device such as a portable gaming device or music player; an electronic reader; etc.), the first user device type different from the second user device type. However, claimed subject matter is not limited to any particular described embodiments, implementations, examples, etc.

Figure 8F:
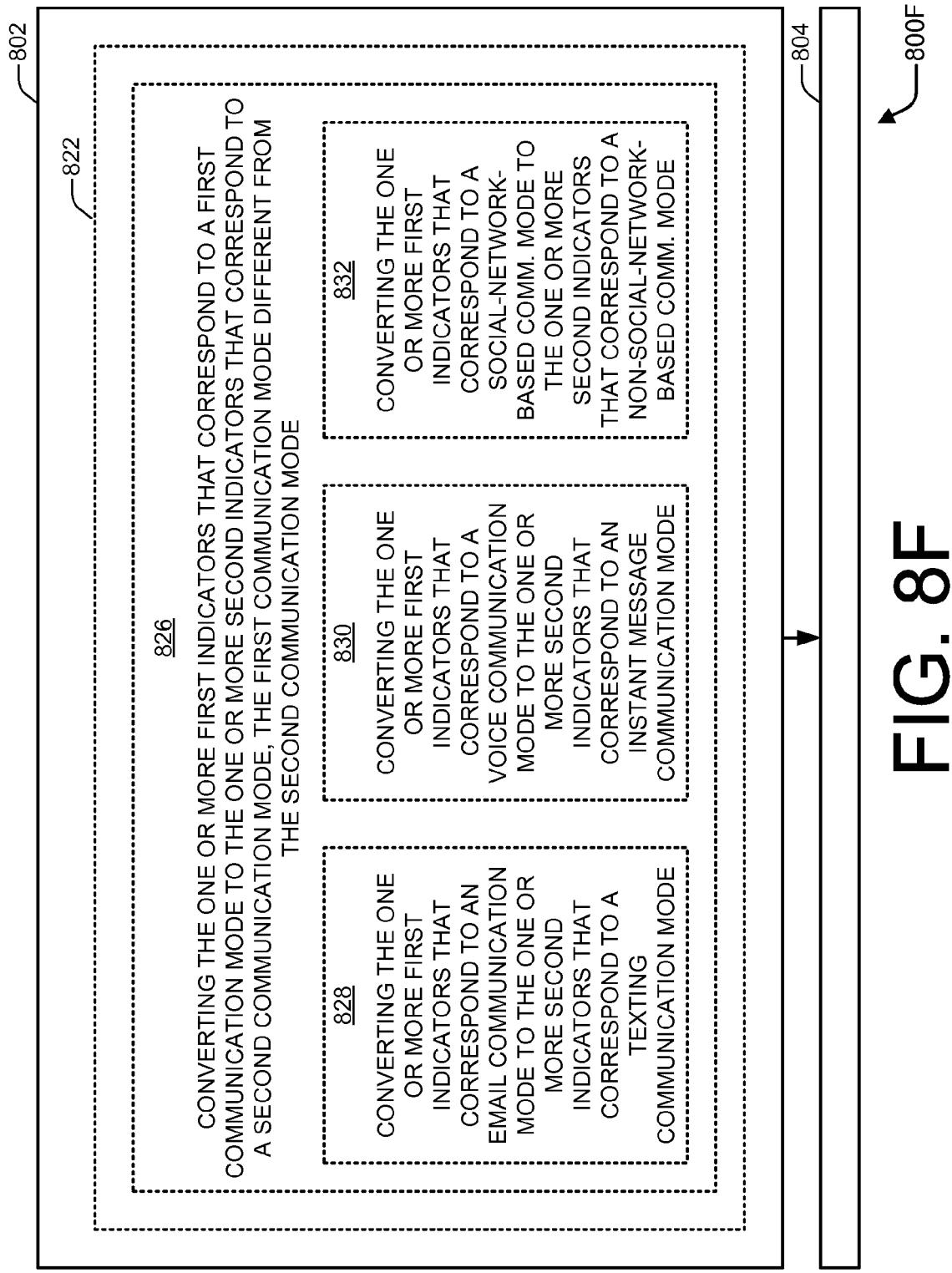

FIG. 8F illustrates a flow diagram 800F having example operations 826, 828, 830, or 832. For certain example embodiments, an operation 826 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators that correspond to a first communication mode to the one or more second indicators that correspond to a second communication mode, the first communication mode different from the second communication mode. For certain example implementations, at least one device 102 or 112 (e.g., a user device 102, a server device 112, a combination thereof, etc.) may convert 708 one or more first indicators 706-1 that correspond to a first communication mode (e.g., an email communication mode, a text message communication mode, an instant message communication mode, a voice communication mode, a phone call voice communication mode, a VoIP voice communication mode, a social-network-based communication mode, a non-social-network based communication mode, a video communication mode, a combination thereof, etc.) to one or more second indicators 706-2 that correspond to a second communication mode (e.g., an email communication mode, a text message communication mode, an instant message communication mode, a voice communication mode, a phone call voice communication mode, a VoIP voice communication mode, a social-network-based communication mode, a non-social-network based communication mode, a video communication mode, a combination thereof, etc.), the first communication mode different from the second communication mode. However, claimed subject matter is not limited to any particular described embodiments, implementations, examples, etc.

For certain example embodiments, an operation 828 may be directed at least partially to wherein the converting the one or more first indicators that correspond to a first communication mode to the one or more second indicators that correspond to a second communication mode, the first communication mode different from the second communication mode (of operation 826) comprises converting the one or more first indicators that correspond to an email communication mode to the one or more second indicators that correspond to a texting communication mode. For certain example implementations, at least one device 102 or 112 (e.g., a user device 102, a server device 112, a combination thereof, etc.) may convert 708 one or more first indicators 706-1 that correspond to an email communication mode (e.g., an email address, a contact or profile entry having at least one email address, a time instant of transmission or reception of an email, a listing of additional recipients such as in a "to:" or "cc:" line, a combination thereof, etc.) to one or more second indicators 706-2 that correspond to a texting communication mode (e.g., a phone number, a contact or profile entry having at least one phone number, multiple time instants or a time range of transmissions or receptions of one or more text messages, a listing of additional recipients such as in a destination field, a combination thereof, etc.). However, claimed subject matter is not limited to any particular described embodiments, implementations, examples, etc.

For certain example embodiments, an operation 830 may be directed at least partially to wherein the converting the one or more first indicators that correspond to a first communication mode to the one or more second indicators that correspond to a second communication mode, the first communication mode different from the second communication mode (of operation 826) comprises converting the one or more first indicators that correspond to a voice communication mode to the one or more second indicators that correspond to an instant message communication mode. For certain example implementations, at least one device 102 or 112 (e.g., a user device 102, a server device 112, a combination thereof, etc.) may convert 708 one or more first indicators 706-1 that correspond to a voice communication mode (e.g., a phone number, a contact or profile entry having at least one phone number, a time duration of at least one phone call, a listing of additional participants in a multi-party call, a combination thereof, etc.) to one or more second indicators 706-2 that correspond to an instant message communication mode (e.g., an instant message address or identity, a contact or profile entry having at least one instant message address or identity, a time instant of transmission or reception of an instant message or a time range of a series of instant messages, a listing of additional instant message senders or receivers, a combination thereof, etc.). However, claimed subject matter is not limited to any particular described embodiments, implementations, examples, etc.

For certain example embodiments, an operation 832 may be directed at least partially to wherein the converting the one or more first indicators that correspond to a first communication mode to the one or more second indicators that correspond to a second communication mode, the first communication mode different from the second communication mode (of operation 826) comprises converting the one or more first indicators that correspond to a social-network-based communication mode to the one or more second indicators that correspond to a non-social-network-based communication mode. For certain example implementations, at least one device 102 or 112 (e.g., a user device 102, a server device 112, a combination thereof, etc.) may convert 708 one or more first indicators 706-1 that correspond to a social-network-based communication mode (e.g., a communication mode that is effectuated at least partially using a social network app, a social network web site, a social network service, a combination thereof, etc., such as tweeting, pinning, writing on a wall, sending a public or private message using a social network web page/service/app, a combination thereof, etc.) to one or more second indicators 706-2 that correspond to a non-social-network-based communication mode (e.g., a communication mode that is effectuated without using a social network app, a social network web site, a social network service, or a combination thereof, etc., such as making a phone call, sending a text message, sending an email, a combination thereof, etc.). However, claimed subject matter is not limited to any particular described embodiments, implementations, examples, etc.

FIG. 8G illustrates a flow diagram 800G having example operations 834, 836, 838, 840, or 842. For certain example embodiments, an operation 834 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators that correspond to a first form of interaction with a service to the one or more second indicators that correspond to a second form of interaction with the service, the first form of interaction different from the second form of interaction. For certain example implementations, at least one device 102 or 112 (e.g., a user device 102, a server device 112, a combination thereof, etc.) may convert 708 one or more first indicators 706-1 that correspond to a first form of interaction (e.g., a browser, an app, a dedicated device, a widget, a combination thereof, etc.) with a service (e.g., an email service, a social network service, a news service, a blogging service, a payment service, a consumer rewards service, a company-customer interaction service, a search service, a communication service, a combination thereof, etc.) to one or more second indicators 706-2 that correspond to a second form of interaction (e.g., a browser, an app, a dedicated device, a widget, a combination thereof, etc.) with the service, the first form of interaction different from the second form of interaction. However, claimed subject matter is not limited to any particular described embodiments, implementations, examples, etc.

For certain example embodiments, an operation 836 may be directed at least partially to wherein the converting the one or more first indicators that correspond to a first form of interaction with a service to the one or more second indicators that correspond to a second form of interaction with the service, the first form of interaction different from the second form of interaction (of operation 834) comprises converting the one or more first indicators that correspond to a browser form of interaction with the service to the one or more second indicators that correspond to a service-specific app form of interaction with the service. For certain example implementations, at least one device 102 or 112 (e.g., a user device 102, a server device 112, a combination thereof, etc.) may convert 708 one or more first indicators 706-1 that correspond to a browser form of interaction with a service (e.g., utilization data derived from or in a format compatible with browser cookies or other data stored by or accessible to a browser) to one or more second indicators 706-2 that correspond to a service-specific app form of interaction with the service (e.g., utilization data derived from or in a format compatible with a mobile or desktop app that is designed to facilitate interaction with a given service). However, claimed subject matter is not limited to any particular described embodiments, implementations, examples, etc.

For certain example embodiments, an operation 838 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators that correspond to a first payment type via the first user device to the one or more second indicators that correspond to a second payment type via the second user device, the first payment type different from the second payment type. For certain example implementations, at least one device 102 or 112 (e.g., a user device 102, a server device 112, a combination thereof, etc.) may convert 708 one or more first indicators 706-1 that correspond to a first payment type (e.g., a manually-entered credit card number, a near field communication (NFC) exchange, a vendor-specific app, a credit card app, a displayed visual code (e.g., a bar code, a quick response (QR) code, a set of numbers, an encoded image authorization, a combination thereof, etc.), a radio frequency identification (RFID), a card or security tag reader, a combination thereof, etc.) via a first user device 102-1 to one or more second indicators 706-2 that correspond to a second payment type (e.g., a manually-entered credit card number, a near field communication (NFC) exchange, a vendor-specific app, a credit card app, a displayed visual code (e.g., a bar code, a QR code, a set of numbers, an encoded image authorization, a combination thereof, etc.), a radio frequency identification (RFID), a card or security tag reader, a combination thereof, etc.) via a second user device 102-2, the first payment type different from the second payment type. However, claimed subject matter is not limited to any particular described embodiments, implementations, examples, etc.

For certain example embodiments, an operation 840 may be directed at least partially to wherein the converting the one or more first indicators that correspond to a first payment type via the first user device to the one or more second indicators that correspond to a second payment type via the second user device, the first payment type different from the second payment type (of operation 838) comprises converting the one or more first indicators that correspond to a near field communication (NFC) payment type via the first user device to the one or more second indicators that correspond to a displayed visual code payment type via the second user device. For certain example implementations, at least one device 102 or 112 (e.g., a user device 102, a server device 112, a combination thereof, etc.) may convert 708 one or more first indicators 706-1 that correspond to a near field communication (NFC) payment type (e.g., a password, a code, an authorization procedure or technique, a vendor identification, a customer identification, a combination thereof, etc. that is transmitted, received, or exchanged via an NFC interface) via a first user device 102-1 to one or more second indicators 706-2 that correspond to a displayed visual code payment type (e.g., a bar code, a QR code, a set of numbers, an encoded image authorization, a vendor identification, a customer identification, a combination thereof, etc. that is transmitted, received, or exchanged via a visual or scanner interface) via a second user device 102-2. However, claimed subject matter is not limited to any particular described embodiments, implementations, examples, etc.

For certain example embodiments, an operation 842 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators that correspond to a first level of geographical positioning precision with respect to the first user device to the one or more second indicators that correspond to a second level of geographical positioning precision with respect to the second user device, the first level different from the second level. For certain example implementations, at least one device 102 or 112 (e.g., a user device 102, a server device 112, a combination thereof, etc.) may convert 708 one or more first indicators 706-1 that correspond to a first level of geographical positioning precision (e.g., a given spatial range or distance, measurements that provide SPS coordinates, measurements that provide a range based on Wi-Fi locations, measurements that provide a range based on cellular base stations, measurements that track a person's bodily location—e.g. because a user device such as a mobile phone is typically carried with a person, measurements that track a person's location from time to time—e.g. because a user device is installed in a vehicle or carried less frequently such as a notebook computer, a combination thereof, etc.) with respect to a first user device 102-1 to one or more second indicators 706-2 that correspond to a second level of geographical positioning precision (e.g., a given spatial range or distance, measurements that provide SPS coordinates, measurements that provide a range based on Wi-Fi locations, measurements that provide a range based on cellular base stations, measurements that track a person's bodily location—e.g. because a user device such as a mobile phone is typically carried with a person, measurements that track a person's location from time to time—e.g. because a user device is installed in a vehicle or carried less frequently such as a notebook computer, a combination thereof, etc.) with respect to a second user device 102-2, the first level different from the second level. However, claimed subject matter is not limited to any particular described embodiments, implementations, examples, etc.

Figure 8H:
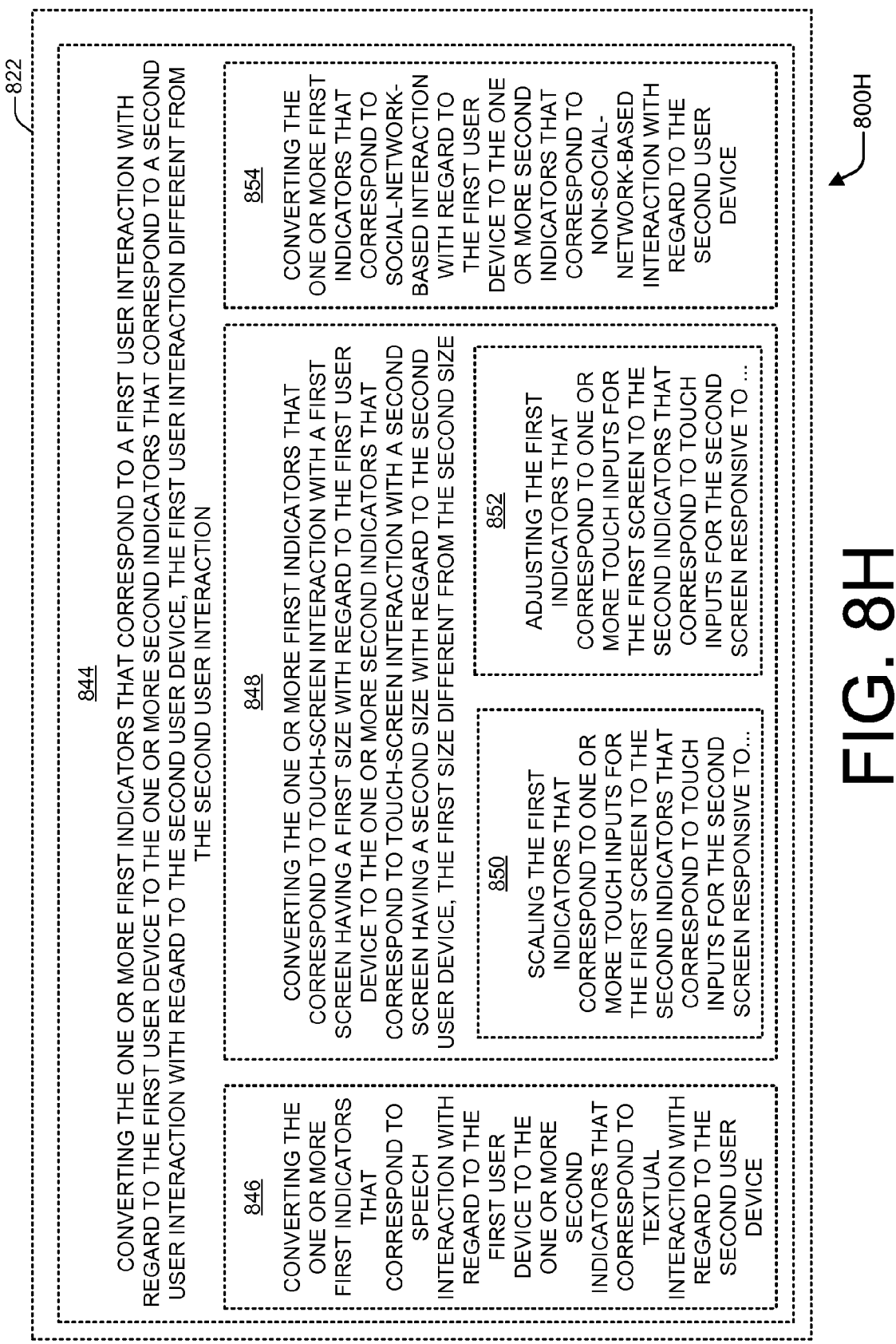

FIG. 8H illustrates a flow diagram 800H having example operations 844, 846, 848, 850, 852, or 854. For certain example embodiments, an operation 844 may be directed at least partially to wherein the converting one or more first indicators of observed utilization of a first user device of the two or more user devices by the at least one authorized user to one or more second indicators of utilization for a second user device of the two or more user devices (of operation 822) comprises converting the one or more first indicators that correspond to a first user interaction with regard to the first user device to the one or more second indicators that correspond to a second user interaction with regard to the second user device, the first user interaction different from the second user interaction. For certain example implementations, at least one device 102 or 112 (e.g., a user device 102, a server device 112, a combination thereof, etc.) may convert 708 one or more first indicators 706-1 that correspond to a first user interaction (e.g., communication mode interaction, touch versus speech interaction, screen size interaction, social network interaction, cellular service provider interaction, bandwidth consumption interaction, user interface (UI) interaction, a combination thereof, etc.) with regard to a first user device 102-1 to one or more second indicators 706-2 that correspond to a second user interaction (e.g., communication mode interaction, touch versus speech interaction, screen size interaction, social network interaction, cellular service provider interaction, bandwidth consumption interaction, UI interaction, a combination thereof, etc.) with regard to a second user device 102-2, the first user interaction different from the second user interaction. However, claimed subject matter is not limited to any particular described embodiments, implementations, examples, etc.

For certain example embodiments, an operation 846 may be directed at least partially to wherein the converting the one or more first indicators that correspond to a first user interaction with regard to the first user device to the one or more second indicators that correspond to a second user interaction with regard to the second user device, the first user interaction different from the second user interaction (of operation 844) comprises converting the one or more first indicators that correspond to speech interaction with regard to the first user device to the one or more second indicators that correspond to textual interaction with regard to the second user device. For certain example implementations, at least one device 102 or 112 (e.g., a user device 102, a server device 112, a combination thereof, etc.) may convert 708 one or more first indicators 706-1 that correspond to speech interaction (e.g., data derived from or appropriate for speech recognition, speech input, speech synthesis, speech output, a combination thereof, etc.) with regard to a first user device 102-1 to one or more second indicators 706-2 that correspond to textual interaction (e.g., data derived from or appropriate for textual input—e.g., via a keyboard, keys, a keypad, virtual versions thereof, a combination thereof, etc.; data derived from or appropriate for textual output—e.g., via a display screen; a combination thereof; etc.) with regard to a second user device 102-2. However, claimed subject matter is not limited to any particular described embodiments, implementations, examples, etc.

For certain example embodiments, an operation 848 may be directed at least partially to wherein the converting the one or more first indicators that correspond to a first user interaction with regard to the first user device to the one or more second indicators that correspond to a second user interaction with regard to the second user device, the first user interaction different from the second user interaction (of operation 844) comprises converting the one or more first indicators that correspond to touch-screen interaction with a first screen having a first size with regard to the first user device to the one or more second indicators that correspond to touch-screen interaction with a second screen having a second size with regard to the second user device, the first size different from the second size. For certain example implementations, at least one device 102 or 112 (e.g., a user device 102, a server device 112, a combination thereof, etc.) may convert 708 one or more first indicators 706-1 that correspond to touch-screen interaction (e.g., pressing, tapping, single or multi-finger movements, sliding, swiping, pinching, a combination thereof, etc.) with a first screen 710-1 having a first size (e.g., a screen height, a screen width, a diagonal dimension of a screen, a number of pixels across a screen height, a number of pixels across a screen width, a number of pixels diagonally across a screen, a pixel density, a number of pixels per linear unit of measurement, a combination thereof, etc.) with regard to a first user device 102-1 to one or more second indicators 706-2 that correspond to touch-screen interaction (e.g., pressing, tapping, single or multi-finger movements, sliding, swiping, pinching, a combination thereof, etc.) with a second screen 710-2 having a second size (e.g., a screen height, a screen width, a diagonal dimension of a screen, a number of pixels across a screen height, a number of pixels across a screen width, a number of pixels diagonally across a screen, a pixel density, a number of pixels per linear unit of measurement, a combination thereof, etc.) with regard to a second user device 102-2, the first size different from the second size. However, claimed subject matter is not limited to any particular described embodiments, implementations, examples, etc.

For certain example embodiments, an operation 850 may be directed at least partially to wherein the converting the one or more first indicators that correspond to touch-screen interaction with a first screen having a first size with regard to the first user device to the one or more second indicators that correspond to touch-screen interaction with a second screen having a second size with regard to the second user device, the first size different from the second size (of operation 848) comprises scaling the one or more first indicators that correspond to one or more touch inputs for the first screen to the one or more second indicators that correspond to one or more touch inputs for the second screen responsive to at least one dimensional measurement that is different between the first size of the first screen and the second size of the second screen. For certain example implementations, at least one device 102 or 112 (e.g., a user device 102, a server device 112, a combination thereof, etc.) may scale (e.g., make larger, make smaller, change a length in one dimension, change a length in multiple dimensions, change a length relative to a size of one screen, change a length relative to a size of two or more screens, reduce a length of a finger movement, increase a length of a finger movement, make any of the above with respect to an area, a combination thereof, etc.) one or more first indicators 706-1 that correspond to one or more touch inputs for a first screen 710-1 to one or more second indicators 706-2 that correspond to one or more touch inputs for a second screen 710-2 responsive to at least one dimensional measurement (e.g., a screen height, a screen width, a diagonal dimension of a screen, a combination thereof, etc.) that is different between a first size of first screen 710-1 and a second size of second screen 710-2. However, claimed subject matter is not limited to any particular described embodiments, implementations, examples, etc.

For certain example embodiments, an operation 852 may be directed at least partially to wherein the converting the one or more first indicators that correspond to touch-screen interaction with a first screen having a first size with regard to the first user device to the one or more second indicators that correspond to touch-screen interaction with a second screen having a second size with regard to the second user device, the first size different from the second size (of operation 848) comprises adjusting the one or more first indicators that correspond to one or more touch inputs for the first screen to the one or more second indicators that correspond to one or more touch inputs for the second screen responsive to at least one pixel count difference between the first screen and the second screen. For certain example implementations, at least one device 102 or 112 (e.g., a user device 102, a server device 112, a combination thereof, etc.) may adjust (e.g., increase a number of pixels in one dimension, decrease a number of pixels in one dimension, increase a number of pixels in two or more dimensions, decrease a number of pixels in two or more dimensions, change a number of pixels per linear unit of measurement, a combination thereof, etc. with respect to) one or more first indicators 706-1 that correspond to one or more touch inputs for a first screen 710-1 to one or more second indicators 706-2 that correspond to one or more touch inputs for a second screen 710-2 responsive to at least one pixel count difference (e.g., a number of pixels of screen height, a number of pixels of screen width, a number of pixels diagonally across a screen, a pixel density, a number of pixels per linear unit of measurement, a combination thereof, etc.) between first screen 710-1 and second screen 710-2. However, claimed subject matter is not limited to any particular described embodiments, implementations, examples, etc.

For certain example embodiments, an operation 854 may be directed at least partially to wherein the converting the one or more first indicators that correspond to a first user interaction with regard to the first user device to the one or more second indicators that correspond to a second user interaction with regard to the second user device, the first user interaction different from the second user interaction (of operation 844) comprises converting the one or more first indicators that correspond to social-network-based interaction with regard to the first user device to the one or more second indicators that correspond to non-social-network-based interaction with regard to the second user device. For certain example implementations, at least one device 102 or 112 (e.g., a user device 102, a server device 112, a combination thereof, etc.) may convert 708 one or more first indicators 706-1 that correspond to social-network-based interaction (e.g., interaction that is effectuated at least partially using a social network app, a social network web site, a social network service, a combination thereof, etc., such as tweeting, pinning, writing on a wall, sending a public or private message using a social network web page/service/app, a combination thereof, etc.) with regard to a first user device 102-1 to one or more second indicators 706-2 that correspond to non-social-network-based interaction (e.g., interaction that is effectuated without using a social network app, a social network web site, or a social network service, such as interaction that does not involve tweeting, pinning, writing on a wall, sending a public or private message using a social network web page/service/app, a combination thereof, etc.) with regard to a second user device 102-2. However, claimed subject matter is not limited to any particular described embodiments, implementations, examples, etc.

Figure 8I:
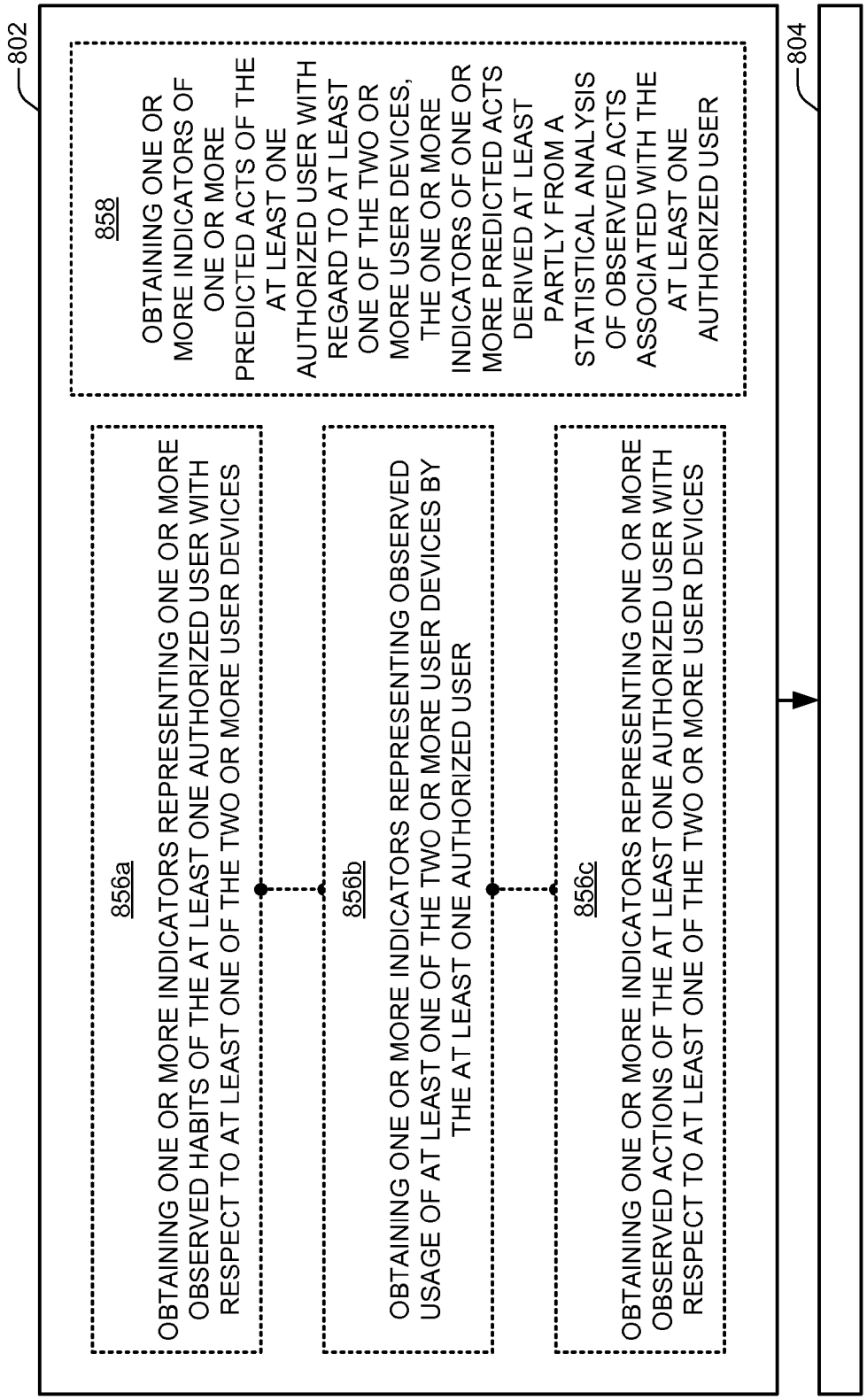

FIG. 8I illustrates a flow diagram 800I having example operations 856a, 856b, 856c, or 858. For certain example embodiments, an operation 856a, an operation 856b, or an operation 856c may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises obtaining one or more indicators representing one or more observed habits of the at least one authorized user with respect to at least one of the two or more user devices (for operation 856a); obtaining one or more indicators representing observed usage of at least one of the two or more user devices by the at least one authorized user (for operation 856b); or obtaining one or more indicators representing one or more observed actions of the at least one authorized user with respect to at least one of the two or more user devices (for operation 856c). For certain example implementations, at least one device 102 or 112 (e.g., a user device 102, a server device 112, a combination thereof, etc.) may obtain one or more indicators 706 representing one or more observed (e.g., wherein an authorized user is being monitored by a device) habits (e.g., acts that are repeated multiple times per day, multiple times per week, a combination thereof, etc.) of the at least one authorized user with respect to at least one of the two or more user devices 102; may obtain one or more indicators 706 representing observed usage (e.g., user interaction, communication modes employed, apps employed, transactions conducted, social network interactions, a combination thereof, etc.) of at least one of the two or more user devices 102 by the at least one authorized user; or may obtain one or more indicators 706 representing one or more observed actions (e.g., user interface actions, user movements, locations visited, user status alerts, a combination thereof, etc.) of the at least one authorized user with respect to at least one of the two or more user devices 102. However, claimed subject matter is not limited to any particular described embodiments, implementations, examples, etc.

For certain example embodiments, an operation 858 may be directed at least partially to wherein the obtaining at least one behavioral fingerprint that is associated with at least one authorized user, the at least one behavioral fingerprint including one or more indicators of utilization of two or more user devices by the at least one authorized user (of operation 802) comprises obtaining one or more indicators of one or more predicted acts of the at least one authorized user with regard to at least one of the two or more user devices, the one or more indicators of one or more predicted acts derived at least partly from a statistical analysis of observed acts associated with the at least one authorized user. For certain example implementations, at least one device 102 or 112 (e.g., a user device 102, a server device 112, a combination thereof, etc.) may obtain one or more indicators 706 of one or more predicted acts 322 of at least one authorized user with regard to at least one of two or more user devices 102, with the one or more indicators of one or more predicted acts derived at least partly from a statistical analysis (e.g., which may include a likelihood function, a histogram evaluation, a probabilistic approach, a Bayesian analysis, a stochastic mechanism, a correlation procedure, a probability density function, a normal/Gaussian distribution, a cumulative distribution function, an expected value, a combination thereof, etc.) of observed acts (e.g., monitored acts of a user known to comprise an authorized user of a user device—e.g., based at least partially on at least one previous, contemporaneous, or continuing authentication determination) associated with the at least one authorized user. However, claimed subject matter is not limited to any particular described embodiments, implementations, examples, etc.

Figure 8J:
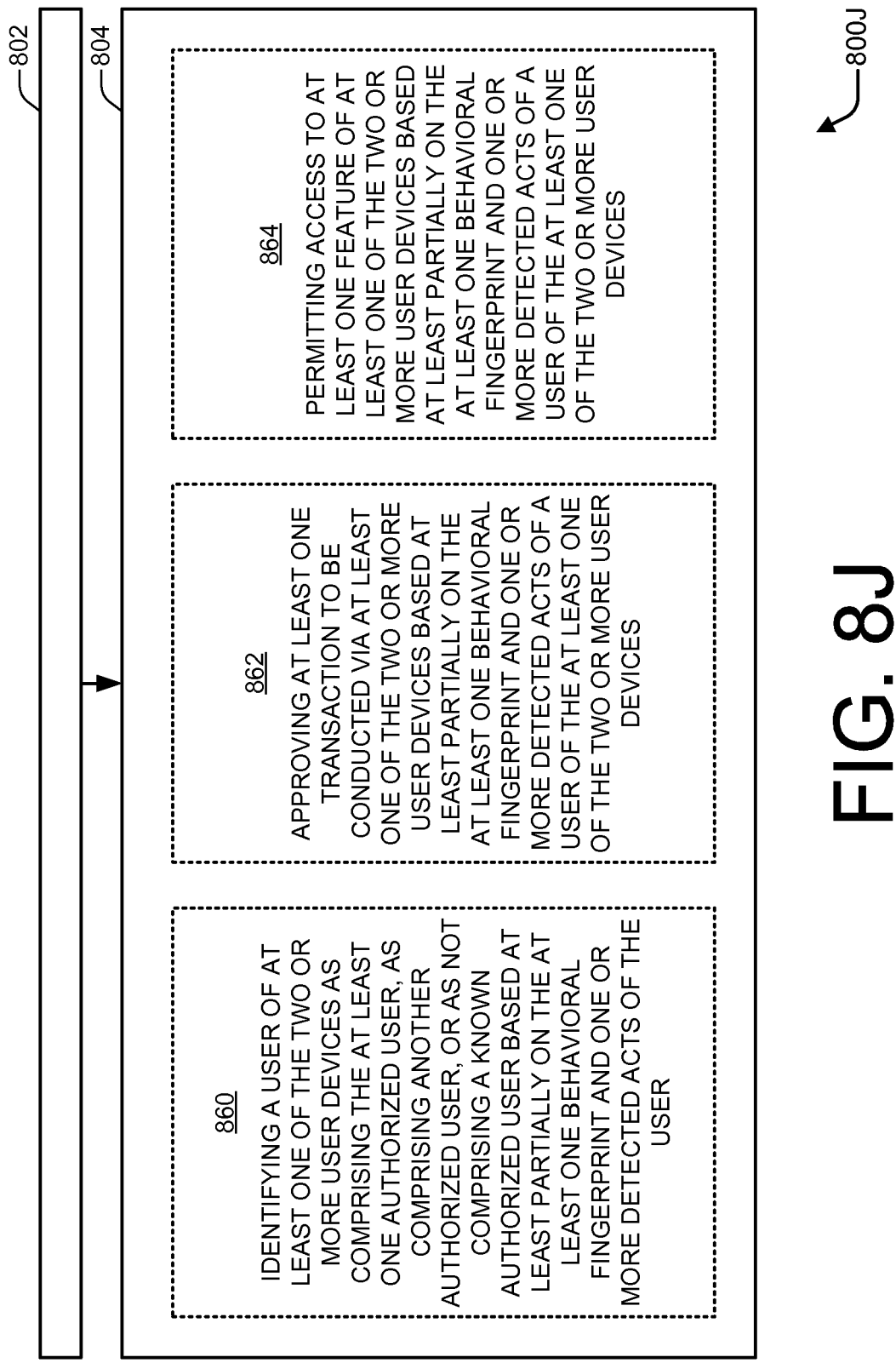

FIG. 8J illustrates a flow diagram 800J having example operations 860, 862, or 864. For certain example embodiments, an operation 860 may be directed at least partially to wherein the performing at least one authentication-related operation based at least partially on the at least one behavioral fingerprint (of operation 804) comprises identifying a user of at least one of the two or more user devices as comprising the at least one authorized user, as comprising another authorized user, or as not comprising a known authorized user based at least partially on the at least one behavioral fingerprint and one or more detected acts of the user. For certain example implementations, at least one device 102 or 112 (e.g., a user device 102, a server device 112, a combination thereof, etc.) may identify a user 104 of at least one of two or more user devices 102 as comprising at least one authorized user (e.g., a user that is authenticated by an authentication unit 602 or identified as a user that is authorized via an authorization unit 604), as comprising another authorized user (e.g., that differs from one that is currently signed in or has an active profile), or as not comprising a known authorized user based at least partially on at least one behavioral fingerprint 110 and one or more detected acts (e.g., monitored acts of a user that is not yet known at the time of monitoring to comprise or is not yet known at the time of monitoring to fail to comprise to a desired degree of certainty an authorized user of a user device—e.g., a user of unknown authorization status; monitored acts to be used to verify if an authorized user is continuing to utilize a user device; a combination thereof; etc.) of user 104. However, claimed subject matter is not limited to any particular described embodiments, implementations, examples, etc.

For certain example embodiments, an operation 862 may be directed at least partially to wherein the performing at least one authentication-related operation based at least partially on the at least one behavioral fingerprint (of operation 804) comprises approving at least one transaction to be conducted via at least one of the two or more user devices based at least partially on the at least one behavioral fingerprint and one or more detected acts of a user of the at least one of the two or more user devices. For certain example implementations, at least one device 102 or 112 (e.g., a user device 102, a server device 112, a combination thereof, etc.) may approve (e.g., permit to continue or complete, enable to continue or be consummated, release funds for, provide bank or credit card authorization for, send an affirmative recommendation regarding, send a positive authentication regarding, a combination thereof, etc.) at least one transaction (e.g., an exchange of consideration, a purchase, an order, a download, a combination thereof, etc.) to be conducted (e.g., initiated, requested, consummated, effectuated, accomplished, monitored, a combination thereof, etc.) via at least one of two or more user devices 102 based at least partially on at least one behavioral fingerprint 110 and one or more detected acts (e.g., monitored acts of a user that is not yet known at the time of monitoring to comprise or is not yet known at the time of monitoring to fail to comprise to a desired degree of certainty an authorized user of a user device—e.g., a user of unknown authorization status; monitored acts to be used to verify if an authorized user is continuing to utilize a user device; a combination thereof; etc.) of a user 104 of at least one of the two or more user devices 102. However, claimed subject matter is not limited to any particular described embodiments, implementations, examples, etc.

For certain example embodiments, an operation 864 may be directed at least partially to wherein the performing at least one authentication-related operation based at least partially on the at least one behavioral fingerprint (of operation 804)

comprises permitting access to at least one feature of at least one of the two or more user devices based at least partially on the at least one behavioral fingerprint and one or more detected acts of a user of the at least one of the two or more user devices. For certain example implementations, at least one device 102 or 112 (e.g., a user device 102, a server device 112, a combination thereof, etc.) may permit access to (e.g., use of, reading of, starting of, opening of, launching of, viewing of, consulting of, manipulation of, configuration of, installation of, execution of, modification of, a combination thereof, etc.) to at least one feature (e.g., capabilities, native applications, operating system functions, communication functions, viewing functions, navigation functions, a combination thereof, etc.) of at least one of two or more user devices 102 based at least partially on at least one behavioral fingerprint 110 and one or more detected acts (e.g., monitored acts of a user that is not yet known to comprise or is not yet known to fail to comprise to a desired degree of certainty an authorized user of a user device—e.g., a user of unknown authorization status; monitored acts to be used to verify if an authorized user is continuing to utilize a user device; a combination thereof; etc.) of a user 104 of the at least one of the two or more user devices 102. However, claimed subject matter is not limited to any particular described embodiments, implementations, examples, etc.

It should be appreciated that the particular embodiments (e.g., methods, processes, apparatuses, systems, media, arrangements, etc.) described herein are merely possible implementations of the present disclosure, and that the present disclosure is not limited to the particular implementations described herein or shown in the accompanying figures.

In addition, in alternative implementations, certain operations, etc. need not be performed in the order described, and they may be modified and/or may be omitted entirely, depending on the circumstances. Moreover, in various implementations, the operations described may be implemented by a computer, controller, processor, programmable device, or any other suitable device, and may be based on instructions stored on one or more computer-readable or processor-accessible media or otherwise stored or programmed into such devices. If computer-readable media are used, the computer-readable media may be, by way of example but not limitation, any available media that can be accessed by a device to implement the instructions stored thereon.

Various methods, systems, techniques, etc. have been described herein in the general context of processor-executable instructions, such as program modules, executed by one or more processors or other devices. Generally, program modules may include routines, programs, objects, components, data structures, combinations thereof, etc. that perform particular tasks or implement particular abstract data types. Typically, functionality of program modules may be combined or distributed as desired in various alternative embodiments. In addition, embodiments of methods, systems, techniques, etc. may be stored on or transmitted across some form of device-accessible media.

It may also be appreciated that there may be little distinction between hardware implementations and software implementations for aspects of systems, methods, etc. that are disclosed herein. Use of hardware or software may generally be a design choice representing cost vs. efficiency tradeoffs, for example. However, in certain contexts, a choice between hardware and software (e.g., for an entirety or a given portion of an implementation) may become significant. Those having skill in the art will appreciate that there are various vehicles by which processes, systems, technologies, etc. described herein may be effected (e.g., hardware, software, firmware, combinations thereof, etc.), and that a preferred vehicle may vary depending upon a context in which the processes, systems, technologies, etc. are deployed. For example, if an implementer determines that speed and accuracy are paramount, an implementer may opt for a mainly hardware and/or firmware vehicle. Alternatively, if flexibility is deemed paramount, an implementer may opt for a mainly software implementation. In still other implementations, an implementer may opt for some combination of hardware, software, and/or firmware. Hence, there are multiple possible vehicles by which processes and/or devices and/or other technologies described herein may be effected. Which vehicle may be desired over another may be a choice dependent upon a context in which a vehicle is to be deployed or specific concerns (e.g., speed, flexibility, predictability, etc.) of an implementer, any of which may vary. Those skilled in the art will recognize that optical aspects of example implementations may employ optically-oriented hardware, software, and/or firmware.

Those skilled in the art will recognize that it is common within the art to describe devices and/or processes in fashion(s) as set forth herein, and thereafter use standard engineering practices to realize such described devices and/or processes into workable systems having described functionality. That is, at least a portion of the devices and/or processes described herein may be realized via a reasonable amount of experimentation.

Aspects and drawings described herein illustrate different components contained within, or connected with, other different components. It is to be understood that such depicted architectures are presented merely by way of example, and that many other architectures may be implemented to achieve identical or similar functionality. In a conceptual sense, any arrangement of components to achieve described functionality may be considered effectively "associated" such that desired functionality is achieved. Hence, any two or more components herein combined to achieve a particular functionality may be seen as "associated with" each other such that desired functionality is achieved, irrespective of architectures or intermedial components. Likewise, any two or more components so associated can also be viewed as being "operably connected" or "operably coupled" (or "operatively connected," or "operatively coupled") to each other to achieve desired functionality, and any two components capable of being so associated can also be viewed as being "operably couplable" (or "operatively couplable") to each other to achieve desired functionality. Specific examples of operably couplable include, but are not limited to, physically mateable and/or physically interacting components and/or wirelessly interactable and/or wirelessly interacting components and/or logically interacting and/or logically interactable components.

Those skilled in the art will recognize that at least some aspects of embodiments disclosed herein may be implemented at least partially via integrated circuits (ICs), as one or more computer programs running on one or more computing devices, as one or more software programs running on one or more processors, as firmware, as any combination thereof, or so forth. It will be further understood that designing circuitry and/or writing code for software and/or firmware may be accomplished by a person skilled in the art in light of the teachings and explanations of this disclosure.

The foregoing detailed description has set forth various example embodiments of devices and/or processes via the use of block diagrams, flowcharts, examples, combinations thereof, etc. Insofar as such block diagrams, flowcharts, examples, combinations thereof, etc. may contain or represent one or more functions and/or operations, it will be understood by those within the art that each function and/or operation within such block diagrams, flowcharts, examples, combination thereof, etc. may be implemented, individually and/or collectively, by a wide range of hardware, software, firmware, any combination thereof, or so forth. For example, in some embodiments, one or more portions of subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of example embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, as virtually any combination thereof, etc. and that designing circuitry and/or writing code for software and/or firmware is within the skill of one of skill in the art in light of the teachings of this disclosure.

In addition, those skilled in the art will appreciate that the mechanisms of subject matter described herein are capable of being distributed as a program product in a variety of forms, and that an illustrative embodiment of subject matter described herein applies regardless of a particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

Although particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that inventive subject matter is defined by the appended claims.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two item," without other modifiers, typically means at least two recitations, or two or more recitations).

As a further example of "open" terms in the present specification including the claims, it will be understood that usage of a language construction of "A or B" is generally interpreted, unless context dictates otherwise, as a non-exclusive "open term" meaning: A alone, B alone, and/or A and B together. Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Although various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
    obtaining at least one behavioral fingerprint that is associated with at least one authorized user, the at least one behavioral fingerprint including at least one or more indicators of utilization of two or more user devices by the at least one authorized user;
    obtaining one or more indicators of one or more predicted acts of the at least one authorized user with regard to at least one of the two or more user devices, the one or more indicators of one or more predicted acts derived at least partly from at least one statistical analysis of one or more observed acts associated with the at least one authorized user; and
    performing at least one authentication-related operation based at least partially on the at least one behavioral fingerprint and the one or more indications of one or more predicted acts,
    wherein at least one of the obtaining at least one behavioral fingerprint or the performing at least one authentication-related operation is at least partially implemented using one or more processing devices.

2. A machine, comprising:
    circuitry for obtaining at least one behavioral fingerprint that is associated with at least one authorized user, the at least one behavioral fingerprint including at least one or more indicators of utilization of two or more user devices by the at least one authorized user;
    circuitry for obtaining one or more indicators of one or more predicted acts of the at least one authorized user with regard to at least one of the two or more user devices, the one or more indicators of one or more predicted acts derived at least partly from at least one statistical analysis of one or more observed acts associated with the at least one authorized user; and circuitry for performing at least one authentication-related operation based at least partially on the at least one behavioral fingerprint and the one or more indications of one or more predicted acts.

3. The machine of claim 2, wherein circuitry for obtaining at least one behavioral fingerprint that is associated with at least one authorized user, the at least one behavioral fingerprint including at least one or more indicators of utilization of two or more user devices by the at least one authorized user comprises:

circuitry for incorporating one or more indicators of utilization of a first user device of the two or more user devices by the at least one authorized user and one or more indicators of utilization of a second user device of the two or more user devices by the at least one authorized user into the at least one behavioral fingerprint.

4. The machine of claim 2, wherein circuitry for obtaining at least one behavioral fingerprint that is associated with at least one authorized user, the at least one behavioral fingerprint including at least one or more indicators of utilization of two or more user devices by the at least one authorized user comprises:

circuitry for receiving one or more updated indicators of observed utilization of a first user device of the two or more user devices by the at least one authorized user; and circuitry for receiving one or more updated indicators of observed utilization of a second user device of the two or more user devices by the at least one authorized user.

5. The method machine of claim 4, wherein:

circuitry for receiving one or more updated indicators of observed utilization of a first user device of the two or more user devices by the at least one authorized user includes at least receiving, by at least one server device, from the first user device the one or more updated indicators of observed utilization of the first user device of the two or more user devices by the at least one authorized user; and circuitry for receiving one or more updated indicators of observed utilization of a second user device of the two or more user devices by the at least one authorized user includes at least receiving, by the at least one server device, from the second user device the one or more updated indicators of observed utilization of the second user device of the two or more user devices by the at least one authorized user.

6. The machine of claim 5, wherein circuitry for obtaining at least one behavioral fingerprint that is associated with at least one authorized user, the at least one behavioral fingerprint including at least one or more indicators of utilization of two or more user devices by the at least one authorized user comprises:

circuitry for incorporating the one or more updated indicators of observed utilization of the first user device and the one or more updated indicators of observed utilization of the second user device into the at least one behavioral fingerprint to produce at least one updated behavioral fingerprint.

7. The machine of claim 6, wherein circuitry for performing at least one authentication-related operation based at least partially on the at least one behavioral fingerprint and the one or more indications of one or more predicted acts comprises:

circuitry for performing at least one other authentication-related operation based at least partially on the at least one updated behavioral fingerprint and the one or more indications of one or more predicted acts.

8. The machine of claim 7, further comprising:

circuitry for transmitting at least one result of the at least one other authentication-related operation that is based at least partially on the at least one updated behavioral fingerprint and the one or more indications of one or more predicted acts to at least one of (i) the first device of the two or more user devices or (ii) a third device.

9. The machine of claim 2, wherein circuitry for obtaining at least one behavioral fingerprint that is associated with at least one authorized user, the at least one behavioral fingerprint including at least one or more indicators of utilization of two or more user devices by the at least one authorized user, comprises:

circuitry for converting one or more first indicators of observed utilization of a first user device of the two or more user devices by the at least one authorized user to one or more second indicators of utilization for a second user device of the two or more user devices.

10. The machine of claim 9, wherein circuitry for converting one or more first indicators of observed utilization of a first user device of the two or more user devices by the at least one authorized user to one or more second indicators of utilization for a second user device of the two or more user devices comprises:

circuitry for converting the one or more first indicators to the one or more second indicators to at least partly compensate for the first user device corresponding to a first user device type and the second user device corresponding to a second user device type, the first user device type different from the second user device type.

11. The machine of claim 9, wherein circuitry for converting one or more first indicators of observed utilization of a first user device of the two or more user devices by the at least one authorized user to one or more second indicators of utilization for a second user device of the two or more user devices comprises:

circuitry for converting the one or more first indicators that correspond to a first communication mode to the one or more second indicators that correspond to a second communication mode, the first communication mode different from the second communication mode.

12. The machine of claim 11, wherein circuitry for converting the one or more first indicators that correspond to a first communication mode to the one or more second indicators that correspond to a second communication mode, the first communication mode different from the second communication mode comprises:

circuitry for converting the one or more first indicators that correspond to an email communication mode to the one or more second indicators that correspond to a texting communication mode.

13. The machine of claim 11, wherein circuitry for converting the one or more first indicators that correspond to a first communication mode to the one or more second indicators that correspond to a second communication mode, the first communication mode different from the second communication mode comprises:

circuitry for converting the one or more first indicators that correspond to a voice communication mode to the one or more second indicators that correspond to an instant message communication mode.

14. The machine of claim 11, wherein circuitry for converting the one or more first indicators that correspond to a first communication mode to the one or more second indicators that correspond to a second communication mode, the first communication mode different from the second communication mode comprises:
  circuitry for converting the one or more first indicators that correspond to a social-network-based communication mode to the one or more second indicators that correspond to a non-social-network-based communication mode.

15. The machine of claim 9, wherein circuitry for converting one or more first indicators of observed utilization of a first user device of the two or more user devices by the at least one authorized user to one or more second indicators of utilization for a second user device of the two or more user devices comprises:
  circuitry for converting the one or more first indicators that correspond to a first form of interaction with a service to the one or more second indicators that correspond to a second form of interaction with the service, the first form of interaction different from the second form of interaction.

16. The machine of claim 15, wherein circuitry for converting the one or more first indicators that correspond to a first form of interaction with a service to the one or more second indicators that correspond to a second form of interaction with the service, the first form of interaction different from the second form of interaction comprises:
  circuitry for converting the one or more first indicators that correspond to a browser form of interaction with the service to the one or more second indicators that correspond to a service-specific app form of interaction with the service.

17. The machine of claim 9, wherein circuitry for converting one or more first indicators of observed utilization of a first user device of the two or more user devices by the at least one authorized user to one or more second indicators of utilization for a second user device of the two or more user devices comprises:
  circuitry for converting the one or more first indicators that correspond to a first payment type via the first user device to the one or more second indicators that correspond to a second payment type via the second user device, the first payment type different from the second payment type.

18. The machine of claim 17, wherein circuitry for converting the one or more first indicators that correspond to a first payment type via the first user device to the one or more second indicators that correspond to a second payment type via the second user device, the first payment type different from the second payment type comprises:
  circuitry for converting the one or more first indicators that correspond to a near field communication (NFC) payment type via the first user device to the one or more second indicators that correspond to a displayed visual code payment type via the second user device.

19. The machine of claim 9, wherein circuitry for converting one or more first indicators of observed utilization of a first user device of the two or more user devices by the at least one authorized user to one or more second indicators of utilization for a second user device of the two or more user devices comprises:
  circuitry for converting the one or more first indicators that correspond to a first level of geographical positioning precision with respect to the first user device to the one or more second indicators that correspond to a second level of geographical positioning precision with respect to the second user device, the first level different from the second level.

20. The machine of claim 9, wherein circuitry for converting one or more first indicators of observed utilization of a first user device of the two or more user devices by the at least one authorized user to one or more second indicators of utilization for a second user device of the two or more user devices comprises:
  circuitry for converting the one or more first indicators that correspond to a first user interaction with regard to the first user device to the one or more second indicators that correspond to a second user interaction with regard to the second user device, the first user interaction different from the second user interaction.

21. The machine of claim 20, wherein circuitry for converting the one or more first indicators that correspond to a first user interaction with regard to the first user device to the one or more second indicators that correspond to a second user interaction with regard to the second user device, the first user interaction different from the second user interaction comprises:
  circuitry for converting the one or more first indicators that correspond to speech interaction with regard to the first user device to the one or more second indicators that correspond to textual interaction with regard to the second user device.

22. The machine of claim 20, wherein circuitry for converting the one or more first indicators that correspond to a first user interaction with regard to the first user device to the one or more second indicators that correspond to a second user interaction with regard to the second user device, the first user interaction different from the second user interaction comprises:
  circuitry for converting the one or more first indicators that correspond to touch-screen interaction with a first screen having a first size with regard to the first user device to the one or more second indicators that correspond to touch-screen interaction with a second screen having a second size with regard to the second user device, the first size different from the second size.

23. The machine of claim 22, wherein circuitry for converting the one or more first indicators that correspond to touch-screen interaction with a first screen having a first size with regard to the first user device to the one or more second indicators that correspond to touch-screen interaction with a second screen having a second size with regard to the second user device, the first size different from the second size comprises:
  circuitry for scaling the one or more first indicators that correspond to one or more touch inputs for the first screen to the one or more second indicators that correspond to one or more touch inputs for the second screen responsive to at least one dimensional measurement that is different between the first size of the first screen and the second size of the second screen.

24. The machine of claim 22, wherein circuitry for converting the one or more first indicators that correspond to touch-screen interaction with a first screen having a first size with regard to the first user device to the one or more second indicators that correspond to touch-screen interaction with a second screen having a second size with regard to the second user device, the first size different from the second size comprises:
  circuitry for adjusting the one or more first indicators that correspond to one or more touch inputs for the first screen to the one or more second indicators that correspond to one or more touch inputs for the second screen responsive to at least one pixel count difference between the first screen and the second screen.

25. The machine of claim 20, wherein circuitry for converting the one or more first indicators that correspond to a first user interaction with regard to the first user device to the one or more second indicators that correspond to a second user interaction with regard to the second user device, the first user interaction different from the second user interaction comprises:
  circuitry for converting the one or more first indicators that correspond to social-network-based interaction with regard to the first user device to the one or more second indicators that correspond to non-social-network-based interaction with regard to the second user device.

26. The machine of claim 2, wherein circuitry for obtaining at least one behavioral fingerprint that is associated with at least one authorized user, the at least one behavioral fingerprint including at least one or more indicators of utilization of two or more user devices by the at least one authorized user comprises:
  circuitry for obtaining one or more indicators representing one or more observed habits of the at least one authorized user with respect to at least one of the two or more user devices;
  circuitry for obtaining one or more indicators representing observed usage of at least one of the two or more user devices by the at least one authorized user; and
  circuitry for obtaining one or more indicators representing one or more observed actions of the at least one authorized user with respect to at least one of the two or more user devices.

27. The machine of claim 2, wherein circuitry for performing at least one authentication-related operation based at least partially on the at least one behavioral fingerprint and the one or more indications of one or more predicted acts comprises:
  circuitry for identifying a user of at least one of the two or more user devices (i) as including at least the at least one authorized user, (ii) as including at least another authorized user, or (iii) as not including at least a known authorized user based at least partially on the at least one behavioral fingerprint, the one or more indications of one or more predicted acts, and one or more detected acts of the user.

28. The machine of claim 2, wherein circuitry for performing at least one authentication-related operation based at least partially on the at least one behavioral fingerprint and the one or more indications of one or more predicted acts comprises:
  circuitry for approving at least one transaction to be conducted via at least one of the two or more user devices based at least partially on the at least one behavioral fingerprint, the one or more indications of one or more predicted acts, and one or more detected acts of a user of the at least one of the two or more user devices, the at least one transaction including at least one of releasing funds for the transaction, providing bank card authorization for the transaction, or providing credit card authorization for the transaction.

29. The machine of claim 2, wherein circuitry for performing at least one authentication-related operation based at least partially on the at least one behavioral fingerprint and the one or more indications of one or more predicted acts comprises:
  circuitry for permitting access to at least one feature of at least one of the two or more user devices based at least partially on the at least one behavioral fingerprint, the one or more indications of one or more predicted acts, and one or more detected acts of a user of the at least one of the two or more user devices.

30. The machine of claim 2, wherein circuitry for obtaining one or more indicators of one or more predicted acts of the at least one authorized user with regard to at least one of the two or more user devices, the one or more indicators of one or more predicted acts derived at least partly from at least one statistical analysis of one or more observed acts associated with the at least one authorized user comprises:
  circuitry for obtaining one or more indicators of one or more predicted acts of the at least one authorized user with regard to at least one of the two or more user devices, the one or more indicators of one or more predicted acts derived at least partly from at least one statistical analysis of one or more monitored acts of at least one user known to be at least one authorized user of the at least one of the two or more user devices.

31. The machine of claim 2, wherein circuitry for obtaining at least one behavioral fingerprint that is associated with at least one authorized user, the at least one behavioral fingerprint including at least one or more indicators of utilization of two or more user devices by the at least one authorized user comprises:
  circuitry for obtaining at least one behavioral fingerprint that is associated with at least one authorized user, the at least one behavioral fingerprint including at least one or more indicators of utilization of two or more user devices by the at least one authorized user, including at least converting (i) one or more first indicators of observed utilization that correspond to at least one feature of a first user device of the two or more devices to (ii) one or more second indicators of observed utilization that correspond to at least one feature of a second user device of the two or more user devices, wherein the one or more first indicators of observed utilization and the one or more second indicators of observed utilization correspond to different features of the first user device and second user device.

32. A machine, comprising:
  means for obtaining at least one behavioral fingerprint that is associated with at least one authorized user, the at least one behavioral fingerprint including at least one or more indicators of utilization of two or more user devices by the at least one authorized user;
  means for obtaining one or more indicators of one or more predicted acts of the at least one authorized user with regard to at least one of the two or more user devices, the one or more indicators of one or more predicted acts derived at least partly from at least one statistical analysis of one or more observed acts associated with the at least one authorized user; and
  means for performing at least one authentication-related operation based at least partially on the at least one behavioral fingerprint and the one or more indications of one or more predicted acts,
  wherein at least one of the means for obtaining at least one behavioral fingerprint or the means for performing at least one authentication-related operation is at least partially implemented using one or more processing devices.

33. A system, comprising:
a computing device; and
at least some instructions which, when executed on the computing device, cause the computing device to at least:
  obtain at least one behavioral fingerprint that is associated with at least one authorized user, the at least one behavioral fingerprint including at least one or more indicators of utilization of two or more user devices by the at least one authorized user;

obtain one or more indicators of one or more predicted acts of the at least one authorized user with regard to at least one of the two or more user devices, the one or more indicators of one or more predicted acts derived at least partly from at least one statistical analysis of one or more observed acts associated with the at least one authorized user; and perform at least one authentication-related operation based at least partially on the at least one behavioral fingerprint and the one or more indications of one or more predicted acts.

\* \* \* \* \*